(12) United States Patent
Wilhelms-Tricarico et al.

(10) Patent No.: US 10,453,479 B2
(45) Date of Patent: Oct. 22, 2019

(54) METHODS FOR ALIGNING EXPRESSIVE SPEECH UTTERANCES WITH TEXT AND SYSTEMS THEREFOR

(71) Applicant: LESSAC TECHNOLOGIES, INC., West Newton, MA (US)

(72) Inventors: Reiner Wilhelms-Tricarico, Belchertown, MA (US); Brian Mottershead, Carlisle, MA (US); Rattima Nitisaroj, Silver Spring, MD (US); Michael Baumgartner, Sachse, TX (US); John B. Reichenbach, Newton, MA (US); Gary A. Marple, Sarasota, FL (US)

(73) Assignee: LESSAC TECHNOLOGIES, INC., West Newton, MA (US)

( * ) Notice: Subject to any disclaimer, the term of this patent is extended or adjusted under 35 U.S.C. 154(b) by 1087 days.

(21) Appl. No.: 13/624,175

(22) Filed: Sep. 21, 2012

(65) Prior Publication Data
US 2013/0262096 A1 Oct. 3, 2013

Related U.S. Application Data

(60) Provisional application No. 61/538,507, filed on Sep. 23, 2011.

(51) Int. Cl.
*G10L 25/90* (2013.01)
*G10L 25/30* (2013.01)
(Continued)

(52) U.S. Cl.
CPC .............. *G10L 25/90* (2013.01); *G10L 13/04* (2013.01); *G10L 25/30* (2013.01); *G10L 13/08* (2013.01); *G10L 15/1807* (2013.01); *G10L 25/75* (2013.01)

(58) Field of Classification Search
CPC ......... G10L 13/08; G10L 13/10; G10L 15/04; G10L 15/06; G10L 15/16; G10L 15/1807;
(Continued)

(56) References Cited

U.S. PATENT DOCUMENTS 4,473,904 A * 9/1984 Suehiro ............... G10L 19/0018
704/207
5,668,926 A * 9/1997 Karaali .................. G10L 13/08
704/232
(Continued)

FOREIGN PATENT DOCUMENTS

JP 2003122380 A * 4/2003

OTHER PUBLICATIONS

Alias, et al. "Reliable Pitch Marking of Affective Speech at Peaks or Valleys Using Restricted Dynamic Programming."Multimedia, IEEE Transactions on 12.6, Oct. 2010, pp. 481-489.*
(Continued)

*Primary Examiner* — James S Wozniak
(74) *Attorney, Agent, or Firm* — K&L Gates LLP

(57) ABSTRACT

A system-effected method for synthesizing speech, or recognizing speech including a sequence of expressive speech utterances. The method can be computer-implemented and can include system-generating a speech signal embodying the sequence of expressive speech utterances. Other possible steps include: system-marking the speech signal with a pitch marker indicating a pitch change at or near a first zero amplitude crossing point of the speech signal following a glottal closure point, at a minimum, at a maximum or at another location; system marking the speech signal with at least one further pitch marker; system-aligning a sequence of prosodically marked text with the pitch-marked speech signal according to the pitch markers; and system outputting the aligned text or the aligned speech signal, respectively.

(Continued)

Computerized systems, and stored programs for implementing method embodiments of the invention are also disclosed.

12 Claims, 6 Drawing Sheets

(51) Int. Cl.
 *G10L 13/04* (2013.01)
 *G10L 25/75* (2013.01)
 *G10L 13/08* (2013.01)
 *G10L 15/18* (2013.01)
(58) Field of Classification Search
 CPC ....... G10L 15/187; G10L 25/75; G10L 13/04; G10L 25/30
 USPC ................ 704/232, 236, 243, 258, 259, 261
 See application file for complete search history.

(56) References Cited

U.S. PATENT DOCUMENTS

| | | | |
|---|---|---|---|
| 5,729,694 A | 3/1998 | Holzrichter et al. | |
| 6,125,344 A * | 9/2000 | Kang | G10L 21/003 704/201 |
| 6,178,402 B1 * | 1/2001 | Corrigan | G10L 15/02 704/258 |
| 6,349,277 B1 * | 2/2002 | Kamai | G10L 25/90 704/205 |
| 6,470,308 B1 * | 10/2002 | Ma | G10L 25/78 704/201 |
| 6,615,174 B1 | 9/2003 | Arslan et al. | |
| 6,847,931 B2 | 1/2005 | Addison et al. | |
| 6,865,533 B2 | 3/2005 | Addison et al. | |
| 6,963,841 B2 | 11/2005 | Handal et al. | |
| 7,136,816 B1 * | 11/2006 | Strom | G10L 13/10 704/260 |
| 7,219,061 B1 * | 5/2007 | Erdem | G10L 25/90 704/207 |
| 7,280,964 B2 | 10/2007 | Wilson et al. | |
| 7,877,259 B2 | 1/2011 | Marple et al. | |
| 8,175,879 B2 | 5/2012 | Nitisaroj et al. | |
| 8,195,463 B2 | 6/2012 | Capman et al. | |
| 8,219,398 B2 | 7/2012 | Marple et al. | |
| 8,527,276 B1 * | 9/2013 | Senior | G06N 3/084 704/258 |
| 2004/0158462 A1 * | 8/2004 | Rutledge | G10L 25/90 704/207 |
| 2004/0172238 A1 * | 9/2004 | Choo | G10L 15/04 704/202 |
| 2004/0176957 A1 * | 9/2004 | Reich | G10L 13/07 704/260 |
| 2005/0060155 A1 | 3/2005 | Chu et al. | |
| 2005/0071163 A1 * | 3/2005 | Aaron | G10L 13/10 704/260 |
| 2005/0137858 A1 | 6/2005 | Heikkinen et al. | |
| 2005/0182629 A1 * | 8/2005 | Coorman | G10L 13/07 704/266 |
| 2006/0259303 A1 * | 11/2006 | Bakis | G10L 13/10 704/268 |
| 2010/0161327 A1 | 6/2010 | Chandra et al. | |
| 2012/0185244 A1 * | 7/2012 | Morita | G10L 25/93 704/207 |
| 2012/0191457 A1 * | 7/2012 | Minnis | G10L 13/10 704/260 |
| 2013/0226569 A1 | 8/2013 | Chandra et al. | |

OTHER PUBLICATIONS

Bailly, et al. "Automatic labeling of large prosodic databases: Tools, methodology and links with a text-to-speech system." The ESCA Workshop on Speech Synthesis. Sep. 1991, pp. 201-204.*
Bellegarda, Jerome R., et al. "Statistical prosodic modeling: from corpus design to parameter estimation." Speech and Audio Processing, IEEE Transactions on 9.1 , Jan. 2001, pp. 52-66.*
Choukri, Khalid et al. "Specifications of Arabic TTS Speech corpus.", May 2005, pp. 1-42.*
Deshmukh, Neeraj, et al. "An advanced system to generate pronunciations of proper nouns." Acoustics, Speech, and Signal Processing, 1997. ICASSP-97., 1997 IEEE International Conference on. vol. 2. IEEE, Apr. 1997, pp. 1-4.*
Fritsch, Jürgen, et al. "Context-dependent hybrid HME/HMM speech recognition using polyphone clustering decision trees." Acoustics, Speech, and Signal Processing, 1997. ICASSP-97., 1997 IEEE International Conference on. vol. 3. IEEE, Apr. 1997, pp. 1759-1762.*
Hussein, Hussein, et al. "A hybrid speech signal based algorithm for pitch marking using finite state machines." Interspeech. Sep. 2008, pp. 1-4.*
Karaali, Orhan, et al. "Text-to-speech conversion with neural networks: a recurrent TDNN approach." arXiv preprint cs/9811032, Nov. 1998, pp. 1-4.*
Prasanna, Mahadeva SR, et al. "Finding pitch markers using first order Gaussian differentiator." Intelligent Sensing and Information Processing, 2005. ICISIP 2005. Third International Conference on. IEEE, Dec. 2005, pp. 140-145.*
Mattheyses, Wesley, et al. "Robust pitch marking for prosodic modification of speech using TD-PSOLA." Proceedings of the IEEE Benelux/DSP Valley Signal Processing Symposium, SPS-DARTS. Mar. 2006, pp. 43-46.*
Milenkovic, Paul. "Glottal inverse filtering by joint estimation of an AR system with a linear input model." Acoustics, Speech and Signal Processing, IEEE Transactions on 34.1, Feb. 1986, pp. 28-42.*
Raitio, Tuomo, et al. "HMM-based speech synthesis utilizing glottal inverse filtering." Audio, Speech, and Language Processing, IEEE Transactions on19.1, Jan. 2011, pp. 153-165.*
Rao, K. Sreenivasa, SR Mahadeva Prasanna, and Bayya Yegnanarayana. "Determination of instants of significant excitation in speech using Hilbert envelope and group delay function." Signal Processing Letters, IEEE 14.10, Oct. 2007, pp. 762-765.*
Smits, Roel, et al. "Determination of instants of significant excitation in speech using group delay function." Speech and Audio Processing, IEEE Transactions on 3.5, Sep. 1995, pp. 325-333.*
Talkin, David. "A robust algorithm for pitch tracking (RAPT)." Speech coding and synthesis 495, 1995, pp. 495 and 497-518.*
Tams, et al. "Intonation for synthesis of speaking styles.", Apr. 2000, pp. 1-7.*
Tao, Jianhua, et al. "The WISTON text to speech system for Blizzard 2008."Blizzard Challenge Workshop. Sep. 2008, pp. 1-4.*
Thomas, Mark RP, et al. "Detection of glottal closing and opening instants using an improved dypsa framework."Proc. 17th Eur. Signal Process. Conf, Glasgow, Scotland. Aug. 2009, pp. 2191-2195.*
Tuerk, Andreas. The state based mixture of experts Hmm with applications to the recognition of spontaneous speech. Diss. University of Cambridge, Sep. 2001, pp. 1-139.*
Veeneman, Dale E., et al. "Automatic glottal inverse filtering from speech and electroglottographic signals." Acoustics, Speech and Signal Processing, IEEE Transactions on 33.2, Apr. 1985, pp. 369-377.*
Wilhelms-Tricarico, Reiner, et al. "The Lessac Technologies hybrid concatenated system for Blizzard Challenge 2013." Blizzard Challenge Workshop 2012. Sep. 2012, pp. 1-6.*
Abrash, Victor. "Mixture input transformations for adaptation of hybrid connectionist speech recognizers." Eurospeech. Sep. 1997, pp. 1-4.*
Fritsch, Jürgen. Modular Neural Networks for Speech Recognition. No. CMU-CS-96-203. Carnegie-Mellon Univ Pittsburgh PA Dept of Computer Science, Aug. 1996, pp. 1-99.*
Kotnik, Bojan, Harald Höge, and Zdravko Kačič. "Noise robust F0 determination and epoch-marking algorithms." Signal Processing 89.12, Dec. 2009, pp. 2555-2569.*
Nitisaroj, Rattima, et al. "The Lessac Technologies System for Blizzard Challenge 2010." The Blizzard Challenge 2010 workshop. Sep. 2010, pp. 1-5.*

(56) References Cited

OTHER PUBLICATIONS

Peng, Fengchun, Robert A. Jacobs, and Martin A. Tanner. "Bayesian inference in mixtures-of-experts and hierarchical mixtures-of-experts models with an application to speech recognition." Journal of the American Statistical Association 91.435, 1996, pp. 953-960.*
Van Vuuren, Sarel. "Pitch estimation." Technical Report CSE-98-005, Feb. 1998, pp. 1-35.*
Blackburn, Charles Simon. Articulatory methods for speech production and recognition. University of Cambridge, Dec. 1996, pp. 1-184.*
Zen, Heiga, et al. "Product of experts for statistical parametric speech synthesis." IEEE Transactions on Audio, Speech, and Language Processing, Jan. 2011, pp. 1-12.*
Formiga, Lluis, et al. "Adaptation of the URL-TTS system to the 2010 Albayzin Evaluation Campaign." Proceedings of FALA, Nov. 2010, pp. 363-370.*
Murthy, P. Satyanarayana, et al. "Robustness of group-delay-based method for extraction of significant instants of excitation from speech signals." IEEE Transactions on Speech and Audio Processing 7.6, Nov. 1999, pp. 609-619.*
Rahim, Mazin, et al. "Robust numeric recognition in spoken language dialogue." Speech Communication 34.1-2, Apr. 2001, pp. 195-212. (Year: 2001).*
Rao et al., "Prosody Modification Using Instants of Significant Excitation", IEEE Transactions on Audio, Speech, and Language Processing, vol. 14, No. 3, May 2006.
David Wolpert and Stefan Bieniawski. Distributed control by lagrangian steepest descent. CoRR, cs.MA/0403012, 2004.
D.H. Wolpert, C.E.M. Strauss, and D. Rajnarayan. Advances in distributed optimization using probability collectives. Advances in Complex Systems, 9(4): 383-436, 2006.
Thorsten Suttorp, Nikolaus Hansen, Christian Igel. E cient Covariance Matrix Update for Variable Metric Evolution Strategies. Machine Learning, Springer Verlag, 2009.
Geoffrey E. Hinton and Simon Osindero, A fast learning algorithm for deep belief nets, Journal of Neural Computation, 2006, vol. 18.
Ruslan Salakhutdinov and Geoffrey Hinton; An Efficient Learning Procedure for Deep Boltzmann Machines; Neural Computation 24, 1967-2006 (2012).
Miguel Á. Carreira-Perpiñán and Geofrey E. Hinton; On contrastive divergence learning, Dept. of Computer Science, University of Toronto; 6 King's College Road, Toronto, ON M5S.
Reiner Wilhelms-Tricarico, et al., The Lessac Technologies Hybrid Concatenated System for Blizzard Challenge 2013, 2013.
Reiner Wilhelms-Tricarico, et al., "The Lessac Technologies Hybrid Concatenated System for Blizzard Challenge 2012", 2012.
P. Satyanarayana Murthy et al.; "Robustness of group-delay-based method . . . "; Speech and Audio Processing, IEEE Transactions on, 7(6): 609-619, 1999.
Y. Cheng, et al.; "Dynamic Properties of Elman . . . "; Proceedings, 2002 International Conference on Machine Learning and Cybernetics, 2002, vol. 2. IEEE, 2002, pp. 637-640.
G.H. Golub and C.F. Van Loan. Matrix computations. Johns Hopkins Univ Pr, 1996.
M.I. Jordan and R.A. Jacobs. Hierarchical mixtures of experts and the EM algorithm. Neural computation, 6(2):181-214, 1994.
Annukka K. Lindell. In Your Right Mind: Right Hemisphere Contributions to Language Processing and Production. Neuropsychol Rev (2006) 16:131-148.
Mark A Randolph, Syllable-based Constraints on Properties of English Sounds; RLE Technical Report No. 555, May 1990, Massachusetts Institute of Technology, Cambridge, MA 02139.
G.Bailly and B. Holm; SFC: A trainable prosodic model. Speech Communication, 46:348-364, 2005.
P.N. Sabes and M.I. Jordan. Reinforcement learning by probability matching. Advances in neural information processing systems, 1996.
L.P. Kaelbling, M.L. Littman, and A.W. Moore. Reinforcement Learning: A Survey. Journal of Artificial Intelligence Research, 4:237-285, 1996.
Nitisaroj, et al. "Use of Lessac Symbols in Text-to-Speech Synthesis", Lessac Technologies, Inc., presentation.
Nitisaroj, et al., "Use of Lessemes in text-to-speech synthesis", in M. Munro, et al. [Eds], Collective Writings on the Lessac Voice . . . : A Festschrift, Llumina Press, 2010.
Ma, J., Xu, L. and Jordan, M. I., "Asymptotic Convergence Rate of the EM Algorithm for Gaussian Mixtures", Neural Computation, 12:2881-2900, 2000.
Kominek, et al., "The Blizzard Callenge 2005 CMU Entry: A Method for Improving Speech Synthesis Systems", Proceedings of Interspeech 2005, 85-88.
Chen, et al., "The USTC System for Blizzard Challenge 2011", iFLYTEK Speech Lab, University of Science and Technology of China, Hefei, P. R. China.
Evans et al., "Need for Automatically Generated Narration" presentation, BooksOnline 2012 Workshop, Oct. 29, 2012, Maui, HI.
Reichenbach, et al., "Need for Automatic Near Human Narration", 28th Annual International Technology and Persons with Disabilities Conference, 2014.
Evans et al., "Need for Automatically Generated Narration", 2012.
Lessac, A., "The Use and Training of the Human Voice: A Bio-Dynamic Approach to Vocal Life", McGraw-Hill, 1996, p. 63-100.
Larochelle, H., Bengio, Y., Louradour, J., and Lamblin, P. "Exploring Strategies for Training Deep Neural Networks", Journal of Machine Learning Research 1 (2009), 1-40.
Jordan et al., "Hierarchical Mixtures of Experts and the EM Algorithm", Aug. 6, 1993, Massachusetts Institute of Technology et al.

* cited by examiner

METHODS FOR ALIGNING EXPRESSIVE SPEECH UTTERANCES WITH TEXT AND SYSTEMS THEREFOR

CROSS-REFERENCE TO A RELATED APPLICATION

This application claims the benefit of provisional patent Application No. 61/538,507, filed on Sep. 23, 2011, the entire disclosure of which is incorporated by reference herein for all purposes.

STATEMENT REGARDING FEDERALLY SPONSORED RESEARCH OR DEVELOPMENT (Not applicable.)

The present invention relates, inter alia, to methods for aligning expressive speech utterances with corresponding text and systems therefor, wherein the expressive speech can have a particular prosody, speaking style, or dialect. More particularly, but not exclusively, the invention relates to system-effected, methods of synthesizing speech from text, and of recognizing voiced speech as text which include aligning expressive speech utterances with corresponding text. The methods of the invention can be computer-implemented employing one or more programs, which can be stored in non-transitory computer-readable media.

BACKGROUND

Known speech technology sometimes has limitations when processing prosodic speech. This may be true for expressive speech synthesis when synthesized directly from the words and phrases of the text to be synthesized as speech, and also for speaker-independent automated speech recognition, which should accurately recognize the emotional state of the speaker as s/he frames the words and phrases of the pronounced utterances. Expressive speech can convey both the linguistic meaning of the words as text as well as the expressive emotional meaning of the text when pronounced with a particular prosody, style, or dialect.

The disclosures of U.S. Pat. No. 8,175,879 to Nitisaroj et al. ("Nitisaroj et al."), and U.S. Pat. No. 8,219,398, to Chandra et al. ("Chandra et al." herein), each of which is incorporated herein by reference, are illustrative of the art. These patents describe and claim methods for improving concatenated speech synthesis and for improving automated speech recognition technologies.

Nitisaroj et al. describes a method of, and system for, automatically annotating text corpora for relationships of uttered speech for a particular speaking style and for acoustic units in terms of context and content of the text to the utterances. Some speech synthesis embodiments are described that employ text annotations to specify how the text is to be expressively pronounced as synthesized speech. In some described speech recognition embodiments, each text annotation can be uniquely identified from corresponding acoustic features of a unit of uttered speech to correctly identify the corresponding text. Using a method of rules-based text annotation, expressiveness can be altered to reflect syntactic, semantic, and/or discourse circumstances found in text to be synthesized, or in an uttered message.

Chandra et al. describes computer-implemented method for automatically analyzing, predicting, and/or modifying acoustic units of prosodic human speech utterances for use in speech synthesis or speech recognition.

Notwithstanding these advances in the art there is a need, in some cases, for improved systems and methods for synthesizing, or recognizing speech that comprises a sequence of expressive speech utterances.

SUMMARY

The present invention provides, in one aspect, a system-effected method for aligning a sequence of expressive speech utterances with corresponding text. The invention includes a speech synthesis system or a speech recognition system employing the method.

The method can be implemented on a computerized system and can include system-processing a speech signal embodying the sequence of expressive speech utterances. The speech signal can be system-generated or can be input to the system, for example, via a microphone or from a file. The method can also include system-marking the speech signal with a pitch marker at a predetermined point in a cycle of the speech signal, for example, at or near a first zero amplitude crossing point of the speech signal following a glottal closure point, at a maximum amplitude point, or at a minimum amplitude point. A change in the relative spacing between the pitch markers can indicate a pitch change in the speech signal. Further, the method can include system marking the speech signal with at least one further pitch marker at the same predetermined point in a further cycle of the speech signal. Optionally, the pitch marking can be repeated multiple times.

If desired, the method can include adjusting the system-marked pitch markers to another point or points in each pitch-marker-to-pitch marker-cycle in order to control or modify a subsequent process, for example, an alternative concatenation process.

In addition, the method can include system-aligning a sequence of prosodically marked text with the pitch-marked speech signal according to the pitch markers in the speech signal. Also, the method can include system outputting the aligned text or aligned speech signal, respectively, if desired.

The pitch markers can correspond with pitch change indications or pitch change implications in the prosodically marked text. Further, the method can include determining a glottal closure point by estimating vocal-tract-related filter properties of a portion of the speech signal, and applying inverse filtering to the signal, using the estimated filter properties.

Still further, the method can include generating an error signal from the filtered speech signal, the error signal resembling the vocal glottal excitation signal and identifying the glottal closure point as a point where the error signal drops, or drops rapidly, after ramping up.

Moreover, the method can include continuously determining glottal closure points and marking the signal with pitch markers at the same predetermined point in each cycle of the speech signal, for example, at zero amplitude crossing points of the speech signal at or near each determined glottal closure point, at maximum amplitude points, or at minimum amplitude points.

In another aspect, the invention also provides a system-effected method for synthesizing speech, or recognizing, speech comprising a sequence of expressive speech utterances. This method can also be implemented on a computerized system and include system-generating a speech signal embodying the sequence of expressive speech utterances and, optionally, system-aligning a sequence of prosodically marked text with the speech signal. In this aspect, the method can include system-encoding expressive intonational content derived from the prosodically marked text into each one of a sequence of phonetic subunits. Each phonetic subunit can bear segmental information from the text. Further, the method can include inputting to a system learning model acoustic data for each phonetic subunit in the phonetic subunit sequence. The phonetic subunit can be addressed as a current phonetic subunit.

In addition the method can include inputting to the system learning model for each current phonetic subunit, acoustic data for at least two phonetic subunits contextually related in the phonetic subunit sequence to the current phonetic subunit. Still further, the method can include operating the system learning model to predict, along multiple paths, for the current phonetic subunit, acoustic parameters to specify the current phonetic subunit, yielding multiple acoustic parameter predictions. Then, the method can include selecting for the phonetic subunit one of the multiple acoustic parameter predictions for the current phonetic subunit. The selected acoustic parameters can be included in the speech signal sequence, and the method can include system outputting the aligned text or aligned speech signal.

The at least two phonetic subunits can include the phonetic subunit immediately previous to the current phonetic subunit and the two phonetic subunits next following the current phonetic subunit, if desired. Alternatively, the at least two phonetic subunits include from one to ten previous phonetic subunits and from one to ten next phonetic subunits.

The method can include feeding back the acoustic data predicted for a previous phonetic subunit as input to the system learning model, or feeding back the acoustic data predicted for from one to ten previous phonetic subunits as input to the system learning model.

Also, the method can include repeatedly processing at least one sentence from a trained voice database to reduce error variance.

Further, the method can include sequencing the acoustic data according to prosodic variables wherein sequencing is system-effected by employing a text corpus pronounced by a speaker using at least two prosodies and an acoustic database for each prosody, wherein the acoustic database is aligned according to the different pitch, amplitude, and duration inflections and rhythms of a different set of prosodic rules for each prosody.

In a further aspect, the invention provides another system-effected method for synthesizing, or recognizing, speech comprising a sequence of expressive speech utterances. The method can be implemented on a computerized system and can include system-generating a speech signal embodying the sequence of expressive speech utterances, the speech utterances being pronounced according to defined prosodic rules; and system-providing a sequence of prosodically marked text. Further, this method can include system-employing a neural network to relate the sequence of speech utterances to the sequence of prosodically marked text, system-aligning a sequence of prosodically marked text with the speech signal, and system outputting the aligned text or aligned speech signal.

This method can also include operating the neural network recursively to reduce an error signal and enable the neural network to learn. The neural network can include a reduced Boltzmann machine, if desired and, optionally, a contrastive divergence learning module.

Still further, this method can include system-marking the speech signal with a pitch marker at a predetermined point in a cycle of the speech signal, for example, at or near a first zero amplitude crossing point of the speech signal following a glottal closure point, the pitch marker indicating a pitch change in the speech signal and, optionally, system marking the speech signal with at least one further pitch marker for a zero amplitude crossing point of the speech signal following a glottal closure point, or other predetermined point in each cycle of the speech signal.

In addition, in this method the pitch markers can correspond with pitch change indications or pitch change implications in the prosodically marked text and, optionally, the method can further include determining a glottal closure point by estimating vocal-tract-related filter properties of a portion of the speech signal and applying inverse filtering to the speech signal, using the estimated filter properties.

Further, the invention provides a method for synthesizing speech, which speech synthesis method includes aligning expressive speech utterances with corresponding text by a method as described herein, and outputting the aligned speech signal. Also, the invention provides a method for recognizing speech, which speech recognition method includes aligning expressive speech utterances with corresponding text by a method as described herein, and outputting the aligned text.

Any of the described method features an be included in any of the various method aspects of the invention, unless a particular method feature is technically incompatible with other features of the method.

The invention also provides a computerized system including non-transitory computer-readable media and at least one program stored in non-transitory computer-readable media, which program includes instructions for performing any one or more of the described methods of the invention or features of those methods. Such a computerized system can be, for example, a speech synthesizer or a speech recognizer.

In addition, the invention provides non-transitory computer media storing at least one program including instructions for performing a method according to the invention.

BRIEF DESCRIPTION OF THE SEVERAL VIEWS OF THE DRAWINGS

Some embodiments of the invention, and ways of making and of using one or more embodiments of the invention, are described in detail herein and by way of example, with reference to the accompanying drawings (which are not necessarily drawn to scale with regard to any internal or external structures shown) and in which like reference characters designate like elements throughout the several views, and in which.

DETAILED DESCRIPTION

Figure 1:
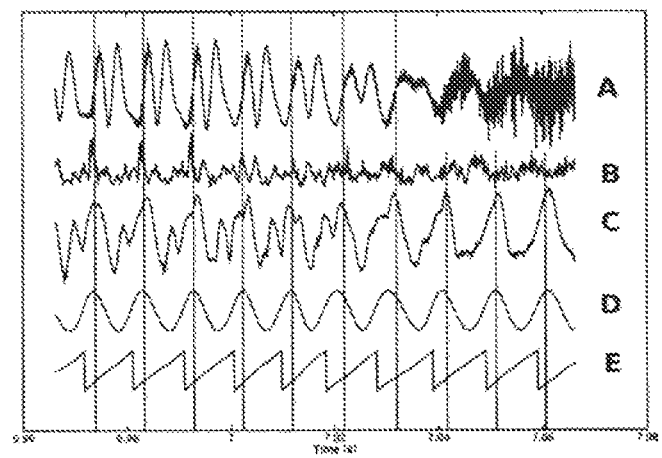
FIG. 1 is a graphic view of basic signal elements that may be present in speech signals processed in method embodiments of the invention.

Some method embodiments of the invention employ one or more machine-learning techniques to relate the acoustic features of a specific pronunciation profile to co-articulated utterances. The specific pronunciation profile can include one or more parameters such as pitch, loudness, rhythm, and/or acoustic duration. The co-articulated utterances can be as pronounced by a voice actor trained to follow acoustic notations applied to a text to be uttered according to factors such as a specific relationship of a speaker to a listener, or of a listener to a speaker, the content and meaning of the message to be delivered, and the key elements to be retained by a listener for recall, and/or emotionally relevant features that enhance the meaning of the message and its ease of recall.

The invention provides system-effected computer automation methods that, in some embodiments, can avoid applying tedious and expensive hand-modifications to correct acoustic segmentation errors in acoustic wave data, in spectral data, and in pitch-marking that can arise in speech synthesis or voice recognition.

The term "system" as used herein refers to a computer system or a computerized system, which includes a computer, a computerized machine or a computerized device. Some illustrative examples of suitable computer systems are described elsewhere herein. The term "machine" refers to a computerized machine. The terms "computer" and "computer system" are to be understood to be synonymous, unless the context indicates otherwise.

In some embodiments, rather than using traditional phonetic symbols, methods according to the present invention use phonetic subunits to describe speech and to label acoustic units for rendering the speech. Useful phonetic subunits are further described elsewhere herein, and may sometimes be referenced as "lessemes", or "Lessemes." LESSEME is a trademark of Lessac Technologies, Inc. In some databases or other collections of phonetic subunits that can be employed in embodiments of the invention, some of the phonetic subunits in the database or other collection can be phonemes, i.e. a small unit of speech that distinguishes one utterance from another, if desired.

The speech utterances referenced herein can be audible utterances from a human speaker or a machine, or electromagnetic signals derived from an audible input and/or capable of being audibilized.

The bracketed phrase "Ref #" followed by a number, as used herein, refers to the correspondingly numbered reference appearing in the list of references which can be found at the end of the specification, before the claims. Each reference listed is incorporated by reference herein.

Embodiments of the invention include adaptations and modifications of computerized machine-learning techniques that provide automated, system-effected methods for synthesizing speech that resemble the pronunciations of a skilled orator or voice actor pronouncing the text according to a defined prosody.

System-effected methods according to the invention disclosed herein can, inter alia, shorten the time and cost to create a new recorded speech database of a speaker pronouncing extended texts according to a defined prosody.

Modified machine learning techniques can be employed in some embodiments of the invention. For example, machine learning techniques can be employed in the ways described in the following paragraphs.

(1) Pitch-marking of acoustic speech data within databases of acoustic utterances with good accuracy rates that can, in some cases, be equal to, or better than painstaking manual pitch-marking procedures often used in speech synthesis.

(2) Accurately aligning marked-up text sequences, including punctuations and prosodic instructions in terms of co-articulation, pitch, amplitude, and duration with the corresponding acoustic speech units as recorded. Such accurate alignment can be further enhanced by using the marked-up text sequences as a guide for a voice actor to follow when recording the acoustic speech units. This method can allow accurate prediction of candidate acoustic units, to be sequenced for concatenation in terms of their acoustic data features as affected by the relevant prosody. Sequences having low or minimal overall target costs and/or join costs can be joined to form continuous expressively synthesized speech. As used herein "target cost" is a measure of the perceptual difference between the desired acoustic unit and the best available acoustic unit.

(3) Similarly, a given text corpus can be pronounced by the same speaker using at least two separately defined prosodies for the same corpus, (i.e., each of the two acoustic databases having different rhythms, intonation profiles, pronunciations, and co-articulations for the same text). Then, acoustic data of human utterances can be sequenced according to prosodic variables. For example, the same text-to-speech synthesis can provide two or more ways of speaking such as reportorial prosody ("just the facts, no spin"), and human interest prosody. These prosodically different signals can then be used, if desired, for initiating multiple-path patterning of acoustic wave and spectral units representing utterances to be automatically recognized as text. The text can represent the utterances under different prosodic instances, increasing the proportion of text recognized accurately and, possibly, indicating the likely emotional state of the speaker. Examples include news reporting of the facts and enhancing a good story with human interest prosodies.

Some embodiments of the invention are useful in the generation of low-cost, appealing, humanized machine speech for a range of applications, including, for example, voice mail systems, computers, games, audio editions of books, magazines, and other entertainment media. The invention also includes methods for developing self-training systems for a human and a computer to learn to expressively and semantically interact vocally by each (the computer and the human) using grammar, semantic, and dialogue rules for speech interaction and corresponding computerized systems for implementing the such methods.

Such methods can be performed individually or combined to provide an improved method for concatenative speech synthesis or speech recognition.

An example of a text-to-speech system which can be employed in the practice of one or more of methods according to the invention includes two main components: a front-end, which can take plain text as input and can output a sequence of graphic symbols, and a back-end, which can take the graphic symbols as input and produce synthesized speech as output.

Use of Phonetic Subunits

Improved production of natural sounding synthesized speech requires an accurate symbolic set of sound representations that can be derived from the input text, and that relate the input text to be pronounced with corresponding synthesized speech utterances that can be heard by a listener. Rather than employing conventional phonetic symbolic representations, such as IPA, SAMPA, or ARPAbet, method embodiments of the invention can employ an extended set of symbolic representations, for example a phonetic subunit set, from the phonosensory symbol set for expressive speech as conceived by Arthur Lessac. (See Lessac, A., The Use and Training of the Human Voice: A Bio-Dynamic Approach to Vocal Life, McGraw-Hill, 1996.) Such a phonetic subunit-based system for annotating text can explicitly capture musicality in speech, and can avoid the artificial separation of prosodic and linguistic features of speech.

Base phonetic subunits can be symbolic representations that carry segmental information similarly to symbolic representations. Optionally, to describe speech accurately and to include in the symbol set information that is not carried by some known phonetic symbols, each base phonetic subunit can be sub-typed into several more specific symbols which then represent phonetic information found in traditional phonetic symbols plus descriptors for co-articulation and/or suprasegmental information or other descriptors. Acoustic data can demonstrate different properties of the members of a set of phonetic subunits which might be notionally collapsed under one phonetic label in another phonetic system.

For General American English, as many as 1,500 different phonetic subunits can be employed, if desired. Compared to other sets of representations which may contain about 50 symbols, phonetic subunits allow more fine-grained distinction of sounds. The number of phonetic subunits employed for General American English can be varied according to the application. For example, at least about 80, at least about 100, at least about 200, or at least about 500 phonetic subunits can be employed. An upper limit to the number of phonetic subunits, if any, can be determined by processing limitations, or other considerations. For example, the upper limit can be 5,000 or higher. Some of the phonetic subunits can be subtypes of another phonetic subunit, if desired. Phonetic subunits (phonetic subunits) of the same type can share closely similar acoustic properties. By having suprasegmental information directly encoded in phonetic subunits, one can enable a system to target available units for concatenation better than a system with a relatively impoverished intonation annotation scheme. Such improved targeting can facilitate producing expressive speech, from a large database or in another manner.

Front-End with Linguistic Knowledge

In one example, the front-end which derives phonetic subunits from plain text input can be a rules-based system. The rules can be based on expert linguistic knowledge from a wide variety of fields including phonetics, phonology, morphology, syntax, light semantics, and discourse. The front-end can label text, building from, at a low level, letters, spaces and punctuation marks. These letters, spaces and punctuation marks can be interpreted by the front-end, and assembled as syllables, words, phrases, sentences, and paragraphs to be spoken, along with context-aware labeling for appropriate co-articulations, intonation, inflection, and prosodic breaks.

In this example, the input text is processed by a syntactic parser which generates the most likely syntactic tree for each sentence, and tags words with part-of-speech (POS) information. In the next step, words are transcribed by use of a pronunciation dictionary into base phonetic subunits accompanied by lexical stress. Homograph disambiguation based on POS tags takes place at this step. Subsequent processing steps modify the base phonetic subunits by making successive decisions based on the overall phrase and sentence structure. In particular, prosodic breaks are inserted in meaningful places by taking into consideration factors such as punctuation, phrase length, syntactic constituency, and balance. In most phrases, an operative word is marked which carries the highest pitch prominence within the phrase. In addition, phonetic subunits are assigned inflection profiles and one of two degrees of emphasis. Context-based co-articulations across word boundaries are also captured. The result is a full phonetic subunit for each sound which encodes expressive intonational content in addition to segmental information found in traditional phonetic symbols.

The front-end process can develop a complete phonetic subunit label stream with plain normally punctuated text as the sole input. This phonetic subunit stream can be delivered to the signal processing back-end.

Voice Database Construction

In addition to the machine readable form used as the input to the signal processing back-end, phonetic subunits are also used in creating new voices, namely to automatically generate a human readable graphic output stream.

During the voice database construction, the text to-be-recorded is first processed by the front-end, yielding a stream of phonetic subunits. The resulting stream is then transformed into a human readable form, as seen in FIG. 1, which can be used as a combined script and score for trained voice talent during the recordings. The way the voice talent records the prompts is controlled by the annotated text and musical score. The recordings of the prompts are then segmented and labeled with the same phonetic subunits that underlie the script and score that the voice talent followed. The fact that the same phonetic subunits are output for the voice talent script as well as for the labeling of the database creates a direct link between each speech snippet and its phonetic subunit label, providing good correspondence between the symbols and the sounds as actually recorded by the voice talent. Such good symbol-to-sound correspondence may not be guaranteed in some known voice database constructions, where the voice talent views only plain text and the subsequent recordings are labeled with the symbols generated by the front-end. Good symbol-to-sound correspondence in the acoustic unit selection process can be used by evaluating acoustic units in the database according to context-dependent linguistic and prosodic features, in order to preselect a subset of acoustic unit candidates, which can be further evaluated by a learning model in ways that such as are further described herein.

System-Effected Pitch Marking

In practicing embodiments of the invention, pitch marks can be used as time stamps for an acoustic speech signal to be synthesized or recognized that indicate the start of each glottal cycle during phonation in voiced speech. Pitch marks can be relevant for both speech analysis and speech synthesis. The fundamental frequency, F0, of the voice source can be independent of the position of the pitch markers but related to their time differences. The fundamental frequency can be derived, for example, by averaging the inverse of the time differences between consecutive pitch markers over several glottal cycles. For additional characterization of the voice, the pitch markers can be used to quantify variations in phonation. The pitch marker allows the computation of variations of the duration of voice cycles, sometimes called jitter, as well as cycle to cycle variations of loudness, sometimes called shimmer. A good characterization of the vocal tract's resonance behavior, closely related to the spectral envelope of the short time spectrum, can be obtained by pitch synchronous analysis of the speech signal using a weighting window centered near the time of strongest excitation of the vocal tract during glottal closure. If the voiced sections of the speech signal are interrupted by unvoiced speech signal intervals, one or more virtual pitch markers can be interpolated to bridge the unvoiced portions, or extend the voiced portions to the left or to the right, if the beginning or end of the speech utterance can be unvoiced. Such interpolations can be calculated so as to provide a smooth transition in F0 from one voiced section of speech signal to the next. In this way a pitch synchronous signal analysis and representation can be computed for the entire speech signal. The information about voiced or unvoiced portions can be stored with each pitch marker, as a continuous parameter over the interval from 0 to 1, if desired.

For synthesis, in a speech synthesizer, pitch markers that are specified as the nearest zero crossing from negative to positive signal amplitude closest to the point of excitation of the vocal tract, which usually forms the beginning of a glottal cycle, or another suitable point in the cycle, can be employed. A number of algorithms and software implementations are known for computing pitch markers, for example, Praat software available from www.fon.hum.uva.nl/praat/. However, for some voice portions the results obtainable with known methods may not be reliable. For example, for low F0 portions, for nasal sounds, and for some mixed excitation, too many or too few pitch marks may be generated.

Basic Method of Pitch Marking

A basic method of pitch marking according to one embodiment of the invention uses Burg's method to compute between a number of partial correlation coefficients ("PARCOR coefficients" herein) obtained from a speech signal by sampling, for example, at 16 kHz for each interval of 320 samples (20 ms) weighted by a Hanning window. The computation can thereby generate a residual signal, or error signal in an overlap-add method proceeding ½ of the window length at each step. The number of PARCOR coefficients can be chosen according to the characteristics of the voice of the speaker, for example, the vocal tract length and/or the signal sampling rate. One example uses 15 to 17 coefficients, with 15 being a useful initial approximation for a female adult and 17 being a useful initial approximation for an adult male. The residual, or error signal, usually shows peaks of energy near the points of glottal excitation. These peaks can be identified using the Hilbert envelope of the signal. The Hilbert transform provides a complex valued analytic signal, wherein the real part is the signal itself, and the imaginary part, is the Hilbert transformed signal. The Hilbert envelope can be the absolute value of the analytic signal, which can be strictly positive so that peak identification is simplified. Pitch markers then can be found by searching in the speech signal for zero crossings having a positive slope near the maximal peaks, which correspond to points of maximal excitation. This method usually works very well for all fully phonated vowel sounds, but may be unreliable for nasal sounds and the lateral L sound, depending on the person's voice. The problem may not be severe if a speaker maintains full phonation even in final unstressed sonorants. For some male voices, one may find some irregular phonations and occasionally F0 can be very low and multiple excitations for a glottal cycle can be detected, possibly resulting in a wrong estimate of F0 as well.

Group Delay Time Improves Robustness

The problem of finding superfluous pitch marks in each cycle can be overcome if the duration of the glottal cycle is known with greater confidence. An improved estimate of the glottal cycles can be obtained in embodiments of the invention by using the magnitude of the error function, and also the local group delay function as computed for each sample from the error signal. For this purpose, a spectral method described by P. S. Murthy & B. Yegnanarayana can be employed to compute short term average group delay times from the residual signal, to estimate the glottal cycle duration and, optionally, to provide additional information for maxima of excitation, can be employed in embodiments of the invention. [Ref #1]

A similar function can be computed, starting from the residual signal, but using a formulation in the time domain. Differentiation of the Laplace transform of a signal with respect to instantaneous frequency is equivalent in the time domain to a multiplication of the signal by the (negative) time parameter. Since the group delay time is the derivative of the phase spectrum, an amplitude normalization in the frequency domain would be required. However, this step can be avoided if the signal is assumed to have a nearly constant amplitude spectrum. A simplification can be obtained by taking into account that the amplitude spectrum of the residual signal may be approximately flat. With this simplification operation in the time domain becomes theoretically possible. In employing such a procedure in embodiments of the invention, a short interval of duration T (usually 10 ms) around the current sampling point can be taken and the center to the time t=0 can be translated. This signal portion then can be multiplied by −t, with −T/2<t<T/2, and the product can be summed over the interval from −T/2 to T/2. Even though this formulation is in the time domain, it can be computationally advantageous to use a fast convolution method with overlap add, again obtaining a faster computation than directly in the time domain. Compared to a method which requires one FFT and one inverse FFT for each sample, this method can be performed effectively with one FFT and one inverse FFT for each short term window (every 80 samples for a window length of 160 samples, corresponding to 10 ms). The resulting approximative group delay time function, denoted g(t) in the following text, shows nearly periodic behavior, and exposes the periodicity of the original speech signal in a convenient manner. A shorter window length can be used for a higher pitched voice; a 10 ms duration is appropriate for a typical male speaker. A further improvement of the signal g(t) can be obtained by performing an amplitude normalization in the time domain, as illustrated, for example in FIG. 1 shows signals from a male speaker.

Referring to FIG. 1, the signal labeled A is a small portion of a speech signal, namely, a 100 ms portion of speech near the end of the word "serves", where the utterance transitions into the voiced "s" at the end of the word. The signal labeled B is the magnitude (Hilbert envelope) of the error signal. The error signal (not shown) can be used to compute the group delay time function g(t), signal C in FIG. 1. The signal labeled D can be obtained by low pass filtering of g(t) and dividing by its Hilbert envelope. Using the Hilbert transform of the signal shown as D, the phase function E is obtained. Phase function E is shown here as a saw-tooth function by using the modulo $2\pi$, but can be computed as an unrolled phase, which enables detection of phase jumps that sometimes occur during rapid transitions of a speech signal. This method can be employed in embodiments of the invention to provide a clean definition of the instantaneous pitch period duration. To obtain pitch markers, within each $2\pi$ phase change interval, the signal is inspected for the maximal point of excitation in the magnitude of the residual (signal B in the figure) and for the nearest zero crossing having a positive slope, or other desired pitch marker location.

Improving Pitch Mark Accuracy Using Neural Networks

The above described pitch-marking method can usefully be employed in embodiments of the invention. However, an improved method of pitch marking would be desirable for some purposes.

Another useful pitch-marking method is to find particular incorrect pitch markings by inspection for a given voice and then to employ an algorithm that reduces the pitch marking errors, for example, by providing rules governing which pitch markings to select among ambivalent pitch markers. While useful, a disadvantage of this method is that additional threshold parameters may be introduced that need to be adjusted to get satisfactory results for multiple voices, which can be complex.

A further useful pitch-marking method employs a neural network that can learn constraints for generating pitch markers, for example, from properly pitch marked speech samples, to predict the rough position of pitch markers directly from the speech signal.

Usually, the mistakes made by known pitch marking algorithms, can only be found by close inspection of a large number of samples. An advantage of using an accurate pitch marking algorithm is that direct inspection of the results may identify larger sets of speech samples for which the pitch marking process was error free.

A neural network then can be trained with the error-free samples. An example of a useful neural network is a multi-layer perceptron with two hidden layers and one input layer. The neural network can make use of hyperbolic tangent (tan h) output non-linearities and can receive as input several consecutive samples from the speech signal, and other derived parameters. Several samples from the residual signal and the signal magnitude, as well as a low pass filtered version of the signal can be used. Some or all of the PARCOR coefficients previously used to compute the residual signal can be interpolated sample by sample and also can be included in the input. A useful alternative method sends the error signal through a filter bank and uses the individual band outputs as input for the neural network. An example of a suitable technique is shown in FIG. 2.

Figure 2:
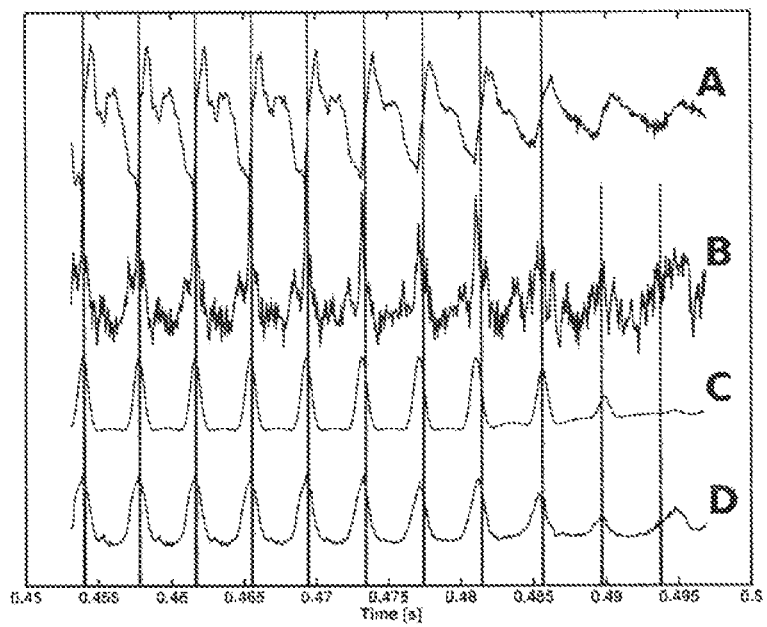
FIG. 2 is a graphic view of various speech-related signals that can be employed in embodiments of the invention.

Referring to FIG. 2, the signal A is a short portion of a speech signal, and the signal B is the magnitude of the error function (Hilbert envelope). Pitch markers, as described herein, are shown as vertical lines through the plots. During network training, a signal exemplified as C in FIG. 2 can be computed as follows: For each pitch marker in a training set, the closest maximum of the error magnitude function is searched in a small interval of 2.5 ms before the pitch marker. At this position, which may coincide with the actual local maximum of the magnitude signal, a bell shaped signal is generated and added to an array that is initialized with all zeros. The resulting signal C provides the learning target for the neural network. The neural network is trained to approximate the signal C, using the difference between its output and the learning target as a learning signal for the standard back propagation algorithm. After training is completed, the network output (signal D in the figure) can be treated as a spike signal not unlike the original residual magnitude signal, and pitch marking is then done, as described herein, by finding nearest zero crossing points. For a large data set, a manageable training set, containing, for example, 200 to 500 short prompts, can be set aside. The set-aside data set can be one for which pitch markers already exist by other means or from the methods described herein, and which excludes examples with faulty pitch markers. The network then can be trained on the selected training set. After training, and, optionally, after verifying that the neural network accurately reproduces the pitch markers from the training set, the neural network can be used to pitch mark the remaining prompts.

Figure 9:
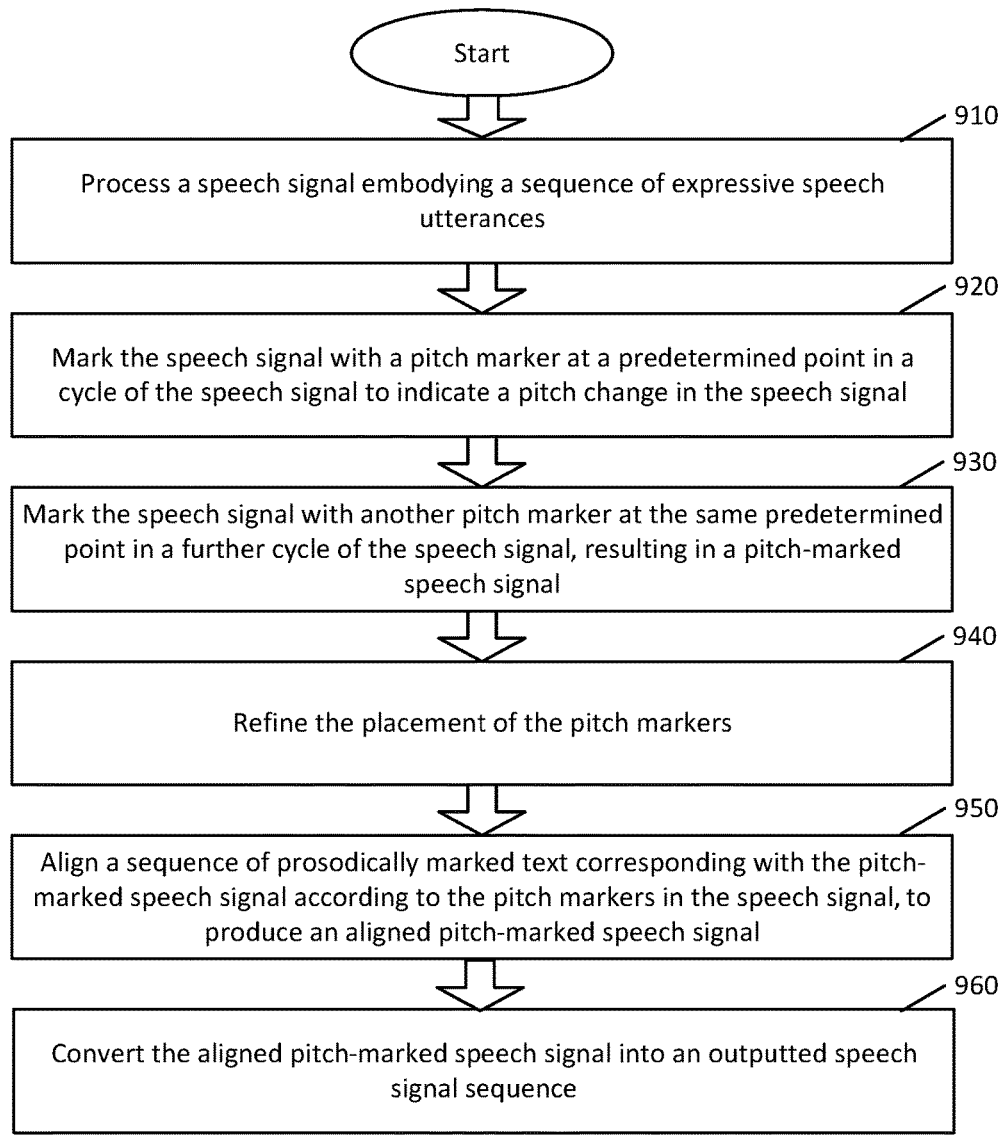
FIG. 9 is a flowchart illustrating an example procedure for automated pitch marking and prosodic alignment with a refinement of the automated pitch marking using a neural network, according to an example embodiment of the present disclosure.

FIG. 9 is a flowchart illustrating an example procedure for automated pitch marking and prosodic alignment with a refinement of the automated pitch marking using a neural network, according to an example embodiment of the present disclosure. In 910 a speech signal representing a sequence of expressive speech utterances is processed. In 920, this speech signal is marked with a pitch marker at a predetermined point in the speech signal, for example, at a zero crossing having a positive slope near the maximal peaks, which correspond to points of maximal excitation. This pitch marker can be utilized to indicate a pitch change in the speech signal. In 930, another pitch marker is added to the speech signal at a predetermined point in a further cycle of the speech signal, resulting in a pitch-marked speech signal. In 940, a neural network is used to refine the placement of the pitch markers. In 950, the speech signal with refined pitch marking is aligned with a sequence of prosodically marked text using the pitch markers in the speech signal. In 960, the aligned pitch-marked speech signal is converted into an outputted speech signal sequence.

Another example of a simple neural network that is useful for detecting voiced speech segments employs training sets of properly pitch marked speech samples that include binary information about voicing, for example, 0 for unvoiced and 1 for voiced. An independent neural network can be trained to predict this parameter, given some or all of the input pitch marking the neural network receives. After training is completed, the network can compute a changing voicing parameter that varies continuously between 0 and 1. This network is trained first, and the output of the trained voicing network becomes part of the input of another neural network, which is trained to compute the spike function for finding the pitch markers.

Using Recurrent Neural Networks to Provide Contextual Memory

A disadvantage that can arise with known multi-layer perceptron structures is the lack of a memory of past input. To provide such context, for each input derived from the speech signal several consecutive samples have to be sent to the input layer. Such networks may therefore become very large. To address this problem, embodiments of the invention can use recurrent neural networks, which feed back internal states to obtain a notion of short time memory.

Figure 3:
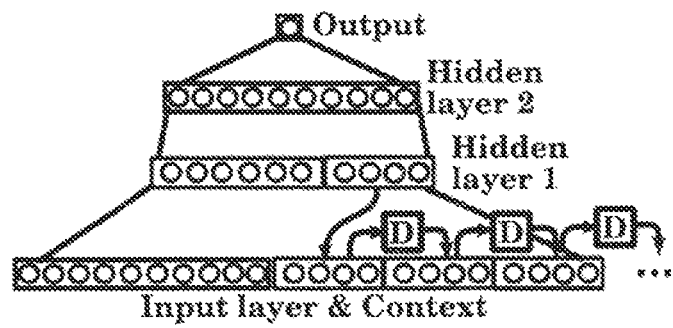
FIG. 3 is a schematic view of the structure of an example of a recurrent neural network that can be employed in embodiments of the invention.

The structure of one example of a useful recurrent neural network that can be used is shown in FIG. 3. Referring to FIG. 3, the input layer (bottom) is split into actual external input to the left and a number of context units with delays to the right. After each execution step, some of the states of the first hidden layer can be copied back to the context part of the input layer as new inputs, while previous states can be moved to the next context portion in the input layer. Using this feedback structure the network has limited information of its short term history stored in the context units. The advantage is that the system may require fewer external inputs, for example, only the current speech sample and residual signal sample and some PARCOR coefficients. Similar or slightly better results may be obtained with a recurrent network even when leaving out all but the first two PARCOR coefficients, and using only as input the current speech signal sample, the residual and a low pass filtered version of the residual signal, while extending the feed back branch over 100 time steps. A disadvantage can be that training of such a network is slower and may require special measures to maintain stability during training. In particular, the learning rate in each layer may have to be adaptively adjusted depending on monitoring of parameters that indicate an instability building up. Following the teachings of Y. Cheng, W. Qi, W. Cai, and others, embodiments of the invention can employ an automatic regulation of the learning rate by computing matrix norms of the weight matrices and monitoring their changes. Too rapid changes thus result in throttling the learning rate, and too small changes in increasing the learning rate. [Ref #2, and Ref #3]

Using Hierarchical Mixture of Experts Models for Predicting Acoustic Features from Linguistic Features A hierarchical mixture of experts (HME) model is a multi-dimensional regression model. The invention includes embodiments employing a hierarchical mixture of experts model that is adapted to create a general mapping model between two data domains based on machine learning from examples of pairs of data from the two sets. The underlying statistical objective is to find optimal computational representations for Bayesian conditional probabilities to use them for the computation of expectation values, for example, by employing a method such as taught by M. I. Jordan and R. A. Jacobs. [Ref #4]

A statistical model can be applied in this work as a method of machine learning that seeks to learn a direct relationship or mapping between properties obtained from the input text and properties obtained from acoustic measurements on speech recorded from a performer reading input text aloud, and optionally according to a particular prosody. The terms acoustic observables, acoustic variables, and acoustic features refer to physically measurable properties of speech sounds, such as F0 contours, voiced/unvoiced information, signal intensity, duration, spectral parameters such as MFCP's. These terms can be either direct quantitative measures on the speech signal that usually can be obtained by automatic digital signal processing, or discrete properties that can be automatically derived from such measurements, as for example the voiced/unvoiced information about a piece of speech signal. In contrast to speech acoustic features, linguistic speech features refer broadly to properties of speech that can be derived directly from a text representation of spoken utterances. Unlike acoustic features, linguistic features by themselves have no directly measurable physical observables but can in most cases be represented as categorical and discrete information such as letters, words, punctuations, manual of style elements all of which can be represented as Boolean variables and related to the acoustic elements of speech; for example one bit being set if the sound is a consonant, or another bit set if a sound is a fricative.

Figure 4:
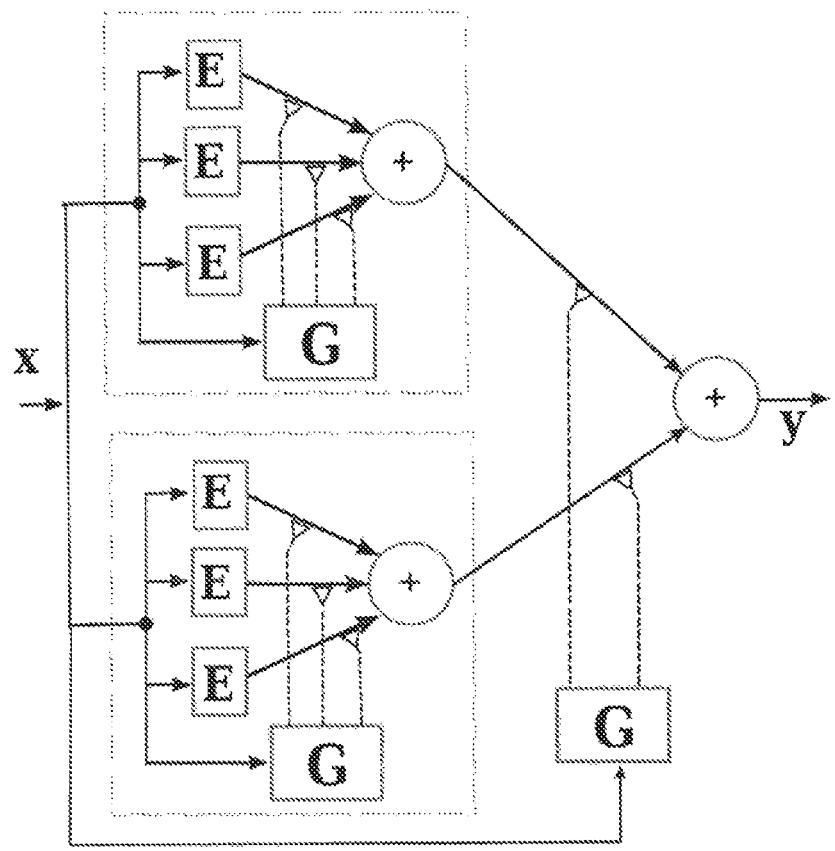
FIG. 4 is a schematic view of a mixture of experts model that can be employed in embodiments of the invention.

An example of a hierarchical mixture of experts model that can be employed is illustrated in FIG. 4. Referring to FIG. 4, each expert E represents one Gaussian in a mixture. Each gate G determines the weighting coefficients, based on the input x, which are combined into an output y.

In a further example of applying hierarchical mixture of experts methods, the input data include both binary and continuous variables. The binary variables can be stored in a binary feature vector. The features can be obtained by specific rules that can be applied to the input text by computational processing in the front-end, for example, as described elsewhere herein. The front-end analyses input sentences in text form and provides a sequence of Phonetic Subunits™ that represent both phonetic and supra-segmental information about the sounds used in speaking the sentences. In particular, prosodic breaks can be inserted in meaningful places that can be deduced from the grammatical structure, and in most partial phrases an operative word is marked which carries the highest prominence of the phrase. In addition, Phonetic Subunits™ can be marked with inflection profiles and one of two degrees of emphasis. Context-based phoneme sensitive co-articulations across word boundaries also can be captured. Using additional information of this nature about phrasing and intonation structure, the phonetic subunits can be specialized by tagging or decorating them according to their specific role in the sentence. From this information binary feature vectors can be generated that represent directly the information contained in each phonetic subunit as well as supra-segmental information that follows from the context of each phonetic subunit in the sentence. Thus far, only the context of the preceding two and the next two Phonetic Subunits™ have been taken into account. As explained further hereinafter, the binary feature vector can be augmented by a vector of continuous non-binary variables, including variables of acoustical observables. The combination of the binary feature variables and the acoustic variables can form the input vector x for the hierarchical mixture of experts. The output of the prediction system, a vector y, in this application, can be a pure vector of acoustic variables, such as duration, F0 parameters and spectral parameters. A database can be created by using automatic segmentation by HMM methods to cut the signal into a most probable piece of signal for each corresponding phonetic subunit in a large number of sentences.

Figure 5:
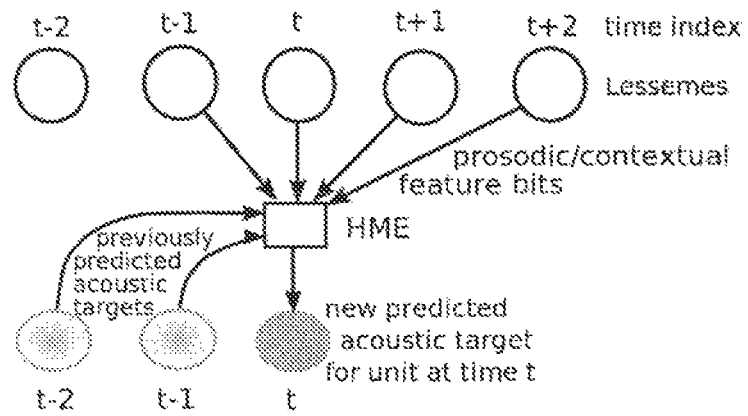
FIG. 5 is a schematic view of a method for prediction of intonation contour and other acoustic targets using a hierarchical mixture of experts model that can be employed in embodiments of the invention.

FIG. 5 illustrates a recurrent and partially auto-regressive method for prediction of intonation contour and other acoustic targets using a hierarchical mixture of experts model that can be employed in embodiments of the invention. The empty circles on top represent phonetic subunits. Binary features, which include phonological and prosodic information from several phonetic subunits before and after the current time slot t can be combined as input together with the previously predicted acoustic features for time t−1 and t−2.

By analyzing both the texts with the front-end and the recorded signal by signal processing methods, the data then can be stored as a sequence of pairs (xi, yi) of data, which can be subsequently used in training the hierarchical mixture of experts model. In the hierarchical mixture of expert models, the basic building blocks can be experts which transform the input variable vectors x, a mixed binary and continuous feature vector, into a vector of acoustic features y. In this application each expert represents a Gaussian model which is a multi-dimensional normal distribution with a fixed covariance matrix and variable expectation vector value. The expectation vector value is computed as follows: In each expert, a matrix of coefficients is multiplied with the input vector to form the expectation vector value of the expert. Computing the expectation value then constitutes the prediction of the acoustic features from the input bit pattern. For the binary parts of the input vectors, the implementation does not actually carry out a matrix multiplication, instead the bits with value 1 select columns in the matrix which can be added up; this is equivalent to multiplying a matrix with a vector containing only the values 0 and 1, but it is faster. While each expert in the model provides one simple regression model of the data, specialization of the multiple experts according to a partitioning of the data domain can give the model useful advantages compared, for example, with a simple regression model. The predictions from each expert can be combined by means of a gating network. The gating network can compute from the input vector x a probability weighting for each expert's output, using a soft-max function. Using these weights, a weighted combination of the individual experts' outputs summing to the actual prediction of the group of experts can be computed. In this basic, non-hierarchical form the model may be equivalent to the Gaussian mixture model, in which both the mixture weights and the expectation vector values can be functions of the input vector x. An extension of this model into a hierarchical model can be achieved by combining several groups of experts and one gating model into a clique, and then using the weights computed by a second gating network to combine the outputs from each clique into the output of a two-layer network. Such a layered design can in principle be repeated again to create third and higher order layered networks. Training can be done by an expectation minimization method such as described by Jacobs and Jordan. Since the full covariance is used in each expert, finding its coefficients is part of the learning procedure. Here a method is used that makes use of a square-root matrix of the inverse of the covariance matrix which can be updated in a learning algorithm, avoiding the need to compute a matrix inverse at each iteration step.

Adding Auto-Regressive Modeling.

While in the initial implementation the hierarchical mixture of experts mode can be trained to predict the acoustic parameters for a phonetic subunit based on the phonetic subunit itself and its left and right neighbors, a useful extension that improve the method is to incorporate an auto-regressive predictive step into the model. The model thus can take into account the current, previous, and prior phonetic subunits as well as the next one or two phonetic subunit positions in the future. Furthermore the model can take into account the predictions of acoustic variables the model has made in the two previous time steps for the two previous phonetic subunits. The implementation and use of this looped-back modification can result in improvements being accomplished without much additional complexity.

Extended Hierarchical Mixture of Experts Modeling

The hierarchical mixture of experts model, can be extended to predict more than two phonetic subunits forward and to account for previous time steps for more than the two previous phonetic subunits. The overall sentence structure has, by virtue of the analytical capacities of the front-end, some effect on each acoustic phonetic subunit, and in particular stressed phonetic subunits, and phonetic subunits with perceivable pitch extensions or changes within its duration (e.g. circumflexes, rhythmic lengthening and shortenings, etc.). This information is usually abstracted away from the result of the sentence parsing. During sentence parsing, for which the Stanford parser is used, specific information about the sentence exists. Part of the sentence parsing step in the front-end is obtaining and taking into account the possible part of speech (POS) information for each word, and after parsing the most likely POS information for each word is known. Furthermore, the function of each word in the parsing tree is known in this state. For example, it is known whether a word occurs in a noun phrase or verb phrase, or whether or not a word is the operative word in a phrase or sentence. While some of this information is used to determine the intonation structure of the sentence, to be then expressed in the derivation of decorations for the phonetic subunits, most of the initially found information by itself, such as POS information and sentence structure information, can be, but for simplicity is not, passed on to the next processing steps. Instead, the assumption has been made that all relevant information is already contained in the detailed specification of phonetic subunits. This is partially justified from A. Lessac's framework of annotating text for teaching actors.

The phonetic subunit notation is partially based on an annotation scheme used in Arthur Lessac's books for teachers that train actors in how to use their voice and body in theater performances to communicate both the objective meaning of words, phrases, and sentences as well as the subjective or emotional meaning of the utterances. What are symbolic decorations of base-phonetic subunits in the computational system, are graphical annotations in the texts used by practitioners of Lessac's methods. The graphical annotation contains boundary markers, markers for inflection and joins, as well as a graphical notation of sentence melody, and could in principle contain more information that can be derived automatically from text by rule.

For voice teaching, these graphical annotations cannot be extended to arbitrary complexity because the notation must remain easily readable for the human speaker. Such a limitation does not exist for a computer, and while it would be confusing for a human reader, for a computer algorithm it would be not be a major problem to augment the number of features by one or two magnitudes. Information like POS can be annotated in a graphic display for the human reader, but it would most like not serve any real purpose: The human reader with a sufficient educational and training level is usually capable of reading a text aloud with meaningful prosody from not much more than the text itself. Additional annotation, as in Lessac's method facilitates to communicate a particular prosodic style. Yet a human reader can do well without visual information that may, for example, indicate that a particular word in a certain context serves as an adverb. The reader does not require explicit annotation about whether a certain word is used as an adjective or, for example, that a sentence substructure constitutes a noun phrase. The human reader can do without such information because of humans' capability to mentally follow the content of a text while reading it, and a focused reader usually derives from following the ongoing text mentally many of the details in the act of speaking that result in successfully encoding both the factual and emotional content and intentions of the text, so that another human listener can pick it up. Yet, for the computer, lacking the human capability of understanding, the additional annotation of the sentence may still be useful as it may indirectly contain some of the information needed to emulate human performance, even if the computer cannot precisely define the correspondence between formal sentence structure, POS and other information on the one hand, and meaning, emotional content, and what is said between the lines on the other. Lacking an analytic or functional model, there is still the possibility that a sufficiently broad statistical model can capture some of these correspondences. For the already developed model which can with success predict many details of intonation, spectral features and durations of sounds, using only the information encoded in the phonetic subunits, the analytical part of the implementation is to find and use linguistic paradigms to decide which of the many features are considered most important, while the statistical model, the hierarchical mixture of experts, simply fills in the details by adjusting a large number of parameters in the learning stage.

For these reasons, it appears that the existing model can be improved by using the additional information that goes far beyond the information encoded in the phonetic subunits.

The hierarchical mixture of experts method can be used within a framework of segmental unit-selection: The hierarchical mixture of experts predicts acoustic target values for each phonetic subunit, and a data base query finds units that come close to the description of the target. These become candidates in a Viterbi search algorithm that decides the best combination of the candidates by evaluating both target cost, namely a measure of perceptual distance to the target acoustic features, and join cost, which is essentially a distance measure between consecutive units.

The properties of speech that we perceive as human listeners as characterizing prosody are usually the pitch changes (melodies) and rhythms of spoken speech. One could say that the melody and rhythm enhance the perception and comprehension of what is being said. Similarly, since emotions strongly affect speech production, trained actors become skilled in entering an emotional state that is called for in the script. In cases of persons without acting training, the conflict between the emotion being experienced and the objective meanings of the words and phrases can result in contradictions between the factual content of a sentence and how it is understood by a listener.

There is also evidence from the neurological and physiological organization of speech production that supports the idea of a partial separability of melody (laryngeal processes) and articulation (tongue and lips). The detailed planning and execution of semantics and syntax, processing grammatical structures, word recall and articulatory planning as well as fine motor control of vocal tract speech articulators may be predominantly functions of the left brain structures, in particular Wernicke's and Broca's areas, while pragmantics, emotional content, rhythm and melody may have a strong presence in the right brain structures, see for example A. K. Lindell. [Ref #5].

Knowledge about human speech production indicates that a speaker's melodies and rhythms are co-generated on the basis of the words and phrases, as well as the emotional state of the speaker and the listener. Speech production is also dependent on the communications model involved in speaking and listening (e.g.—one speaking to many, many speaking to many, the motive for the speaker to speak and the motive for the listener to listen; the structuring of the speech situation—monologue, dialogue, etc.; and the overt process employed: debate, story-telling, arguments, conversational dialogues, sales pitches, etc., etc.). Once a prosody is defined, specified, and corpus has been read aloud using utterances according to the prosodic rules, one has an acoustic database of prosodic utterances and the prosodic information contained in that database may be used to modify candidate units by making pitch and duration alterations, before or after they are concatenated. Some of this separation can be done on the signal level by modifying duration and pitch on the signal level. In a unit concatenation speech synthesizer embodiments of the invention, this prosodic information can also be used to bias selection criteria for acoustic parameters so as to achieve a particular prosodic effect.

System-effected method embodiments of the invention for synthesizing speech, or for recognizing speech, can include two hierarchical mixture of experts models, one working on the larger time scale for rhythm and melody planning, the other on the fine grained time scale of word, syllable, and speech sounds, but depending on the first hierarchical mixture of experts. The first hierarchical mixture of experts model takes as input the information that is seen to be foremost connected with the speech melody, for example, supra-segmental information and phrasing information. This includes the feature specification of prosodic breaks in the sentence and between sentences, the features that distinguish pause types, the features that describe phrase and sentence type, and further the word and syllable counts within a phrase. In addition for each word the POS information is included, and for each syllable a syllable type information, see below. The output of this model is the prediction of contour parameters on the phrase level describing the overall speech melody phrase by phrase, and a set of parameters from which syllable duration can be computed for each syllable to get the base timing. To facilitate this, the model needs to distinguish between different syllable types, as it is known that syllable duration varies to different degrees depending on type: For an open syllable duration is likely to vary more than for a closed syllable; a syllable ending with a nasal sound is likely to be more elastic in duration than one ending with a stop, etc. So syllables can be distinguished by creating a few classes in which, for example, the syllables of the words "stick" and "spot" are considered the same type, namely CCVC. More elaborate syllable classification schemes may combine articulatory and manner features describing the onset, the nucleus and the coda of a syllable in such a way that they are only minimally specified, or simpler, by combining a subset of the basic sound features of the underlying sounds that make up the syllable. A useful method of syllable classification that can be employed can be found in the work by M. A. Randolph. [Ref #6]

Figure 6:
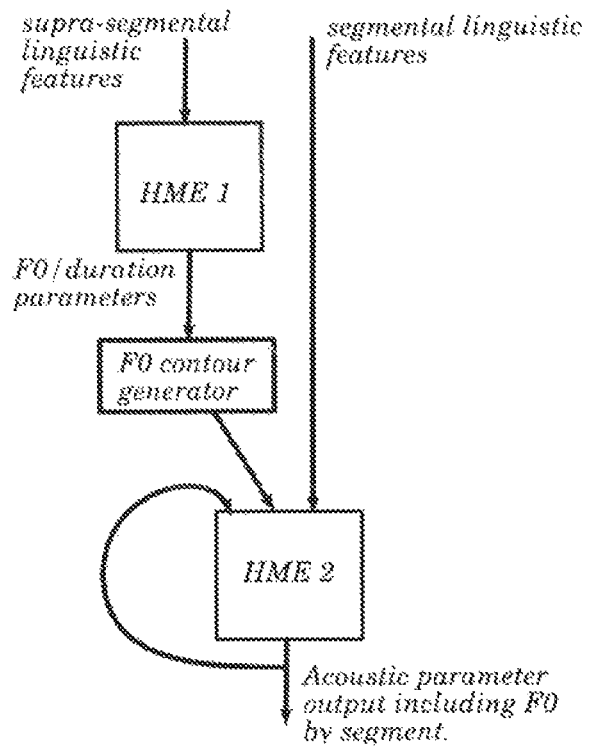
FIG. 6 is a schematic view of a method of prediction of adjustments employing cooperation of two hierarchical mixture of experts models that can be employed in embodiments of the invention.

FIG. 6 illustrates a method employing cooperation of two hierarchical mixture of experts models. Hierarchical mixture of experts 1 predicts from supra-segmental information the overall F0 contour and syllable durations. hierarchical mixture of experts 2 uses as input the segmental linguistic features, the output of hierarchical mixture of experts 1, and the feed back acoustic parameters predicted in a previous step, and predicts local adjustments to the F0 contour and the other acoustic parameters.

Referring to FIG. 6, a first hierarchical mixture of experts module, HME 1, can make the following predictions. (a) For each syllable in a phrase, prediction of a duration scaling factor that describes by how much the duration of a certain syllable should be stretched or shortened depending on context. This information together with the known syllable type and a tabled average duration for each type (to be obtained from the data) allows us to compute the syllable timing for an entire phrase. (b) For each syllable, prediction of at least one parameter that is used to generate an approximate F0 contour, for example by using the prediction values as control points for a spline that represents F0 as a function of a time parameter. There may be no need to use more than just one via-point of F0 per syllable, because the F0 contour is not specified by HME 1 alone. HME 1 can provide a base contour for the melody, and a second hierarchical mixture of experts module, HME 2 computes corrections to this contour, both in terms of duration changes and F0 changes. The previously described model using only one hierarchical mixture of experts predicts for each phonetic subunit the average F0, the beginning F0 and the beginning slope of F0 (and of course other acoustic variables) whereby the values of acoustic features at the end of one segment are stipulated as being equal to those at the beginning of the next. Therefore the hierarchical mixture of experts only predicts values for the beginning of a phonetic subunit. For the last phonetic subunit in a phrase the end values are provided by the predicted values for the following prosodic break or pause. In the extended model with two hierarchical mixtures of experts the second one predicts F0 values and slope values relative to the contour that is computed after HME 1 has made its predictions. The implementation requires that all training data are computed in consideration of the generative model. F0 contours need to be re-analyzed and expressed in terms of two models that create the actual F0 contour as summation. HME 1 learns on one set of data, HME 2 on the other. Expressed more figuratively, HME 1 learns to draw a smooth and only approximate curve of F0, and HME 2 draws a detailed curve that is generated as a deviation of the first by local stretching and shortening in the time domain and adding local offsets for F0. As described further below, HME 2 takes the output of HME 1 into account both in training and in production.

The approach of melody modeling by adding contour components borrows some ideas from a promising method for stylized prediction of F0 contours in the work of B. Holm and G. Bailly. In their work neural networks are trained to learn to transform combinations of ramp-like timing signals into F0 contours. [Ref #7]

The above described additive model for F0 (and multiplicative model for duration) is not the only way how this can be implemented. An alternative is to use dynamic system modeling for the F0 contours. This requires that the measured F0 contours are analyzed by fitting optimal control parameters for two different dynamic models that are unidirectionally coupled (the second one is slave of the first), and which operate on different time scales (phrase versus syllable and phonetic subunit). Their common output is the final F0 contour.

Referring again to FIG. 6, HME 2 receives two types of input. One part of its input are the same features as used in the previously described single stage hierarchical mixture of experts models, namely binary linguistic features for the phonetic subunits and the acoustic parameter predictions from previous phonetic subunits. For HME 2, in the combined model, the input is augmented by the results coming from HME 1, for example, reconstructed rough F0 contours and duration information for syllables, as well as pause durations. HME 2 predicts all other parameters including the spectral coefficients. HME 2 also predicts a more fine-grained F0 contour description, for example, by generating a signal that is added to the more skeletal F0 predictions from HME 1, and stretches or compresses locally the time parameter of HME 1. It can also be advantageous to use some of the supra-segmental features that are input to HME 1 also as additional input to HME 2.

In the method illustrated in FIG. 6, the two hierarchical mixtures of experts work in series. The design can train the first hierarchical mixture of experts first, and keep its parameters fixed while the second hierarchical mixture of experts is trained. For the training of the first hierarchical mixture of experts, the data at the output of the first hierarchical mixture of experts, for example, F0 and duration parameters, are coefficients that describe an entire phrase without necessarily taking smaller segment information into account. Accordingly, the analysis of the signal and the reconstruction of F0 contours in the box labeled F0 contour generator may make only limited use of segmental information, only retaining the information at syllable level (syllable type and stress information), and all it has to predict about the syllable is a relative duration scaling factor and a few F0 contour parameters per syllable. This information together with the known type of syllable is sufficient to create an approximate F0 contour and duration profile. The details are later filled in or refined by the second hierarchical mixture of experts. This allows a presentation with fewer parameters, which is likely to be advantageous for the training of HME 1. With regards to F0, the second hierarchical mixture of experts only has to improve the F0 contour using more local information, by computing local corrections to duration and F0.

Since training of the second hierarchical mixture of experts is done after the training of the first is finished, at this point it can be assumed that the F0 contour generator has produced a smooth approximation of the F0 contour from the predictions of the first hierarchical mixture of experts. This information becomes part of the input to the second hierarchical mixture of experts, together with the remaining segmental linguistic features and the acoustic parameters from the feed-back loop, as described previously herein with reference to FIGS. 5 and 6.

Hierarchical Mixture of Experts Network.

Some useful characteristics of a hierarchical mixture of experts and of each of the hierarchical mixture of experts in the extended structure using two or more hierarchical mixtures of experts will now be described. Some mathematical foundations for the hierarchical mixture of experts model are described by Jordan and Jacobs in several articles; see the references at the end of this specification. In hierarchical mixture of experts models, the basic building blocks can be mathematical constructs called experts which transform the input variable x. In this application, a combination of a binary feature vector and a feature vector with real coefficients, are transformed into a vector of acoustic features y with D dimensions. In one model this is a simple linear transformation: In each expert, a matrix of coefficients can be multiplied with the input vector to form the output of the expert, which constitutes the prediction of the acoustic features from the input bit pattern. Since the input x is binary, the implementation does not actually carry out a matrix multiplication, instead the bits with value 1 select columns in the matrix which are added up See FIG. 4, described previously.

A mixture with just one expert would be a simple regression model, but by combining several experts, which usually provide different estimates for the same input (depending on the values in the large coefficient matrix) the data can actually be represented by multiple local linear maps. The (soft) switching between these local maps (which usually overlap) is the task of the gating network. The output of each expert in the model is multiplied with a weight computed from the input feature bits in the gating network.

A hierarchical mixture of experts (hierarchical mixture of experts) with two levels can be organized such that two gating networks filter the output of the experts. The experts can be organized in several groups called cliques. For each clique one gating network assigns a weight for each expert in the clique, and a final gating network computes a weight for each clique, so that the final output is a combination of the output of all experts in the model. The predictions of each expert and all gate weights are computed from the input.

Defining a Hierarchical Mixture of Experts Model

Figure 7:
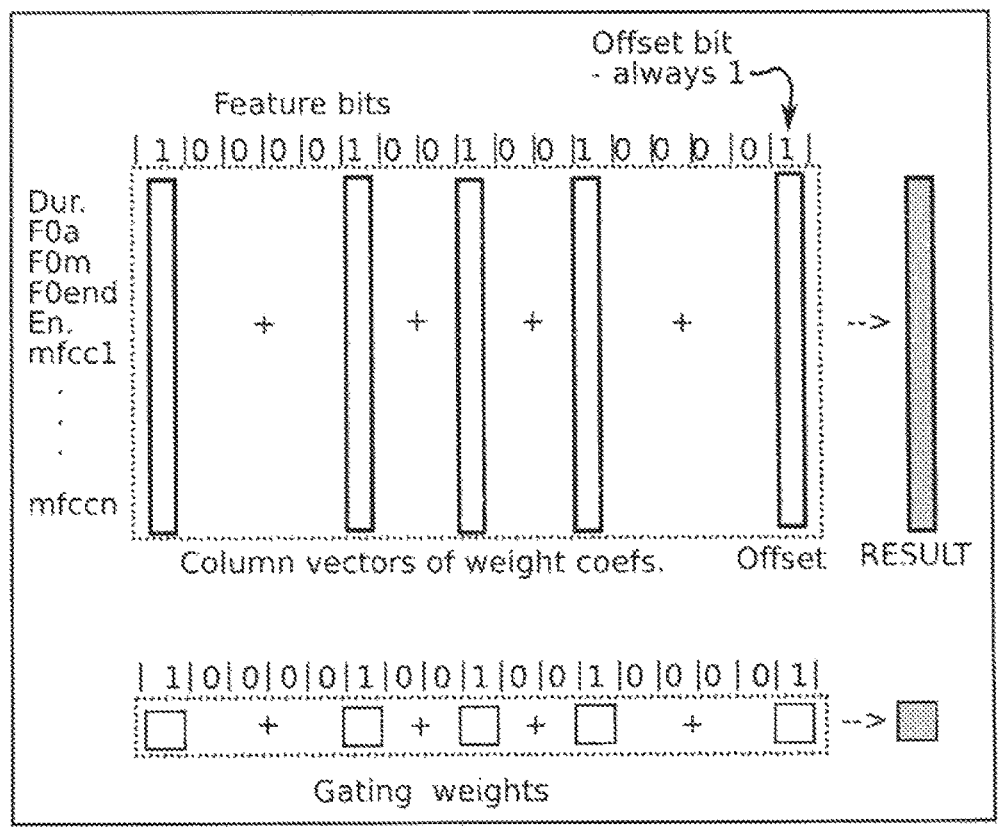
FIG. 7 is a schematic view of a computation for Boolean input vectors that can be employed in embodiments of the invention.

Referring to FIG. 7, the schematic showing of a computation for Boolean input vectors that can be employed assumes L cliques, and in each clique there are K experts. K is the same for all cliques, for simplicity, but is not a principle requirement. In the following the index i is for the clique, and j for the expert. The expert (j|i), which is the j-th expert in clique i, has a matrix $U_{ij}$ used to compute the output vector, the output vector $\mu_{ij}$ computed as $\mu_{ij} = U_{ij}x$.

$$g_{j|i} = g_{j|i}(x, W_{ij}) = \frac{e^{W_{ij}^T x}}{\sum_{k=1}^{K} e^{W_{ik}^T x}} \quad (1)$$

In this example, there is one matrix $U_{ij}$ for each expert in the model, so there are L×K such matrices.

The function used here provides a number between 0 and 1, and within each clique the gj|I add up to 1 for all inputs x. It provides a soft partitioning of the input space The next level of gating is similar, there is one weight coefficient $v_i$ for each clique and the weight for clique i is computed as:

$$g_i = g_i(x, v_i) = \frac{e^{V_i^T x}}{\sum_{k=i}^{K} e^{V_k^T x}} \quad (2)$$

Generative Data Model

A stochastic model that underlies this structure can be derived from the concept that the network implements a two-level decision process: In each partial network, for example, a clique of K experts, one of the K processes generates for an input $x_t$ (at time t), one data point which becomes the output. A different process, for example, the process associated with the gating in each clique, makes a decision based on the input $x_t$ which of the experts of that clique is the active process at that time. Then, for the entire network one gating process decides which clique is active at time t, a decision that is also derived from the input x.

This generative data model allows to formulate the problem of finding an optimal map as the problem of maximizing the likelihood of the actually observed data pairs {x,y} by adjusting the coefficients in the matrices of the network.

Each of the experts is assumed to be a Gaussian process. The input, x, determines the location in the acoustic feature space where the output y has its highest probability. The probability density function of the process is represented as a multivariate normal distribution with the expectation value $\mu_{ij} = U_{ij} x$:

$$P_{j|i}(y|x, U_{ij}) = \mathcal{N}(y; \mu_{ij}, \Sigma_{ij}) = \frac{e^{-\frac{1}{2}(y-\mu_{ij})^T \Sigma_{ij}(y-\mu_{ij})}}{(2\pi)^{D/2} \det(\Sigma_{ij})^{1/2}} \quad (3)$$

The value of the covariance $\Sigma_{ij}$, which also needs to be obtained from the data, determines the scope of the expert: If $\Sigma_{ij}$ is big (has large eigenvalues) the distribution is wide and flat, and in the extreme of a very small $\Sigma_{ij}$ the probability is high only in a very small vicinity around the expectation value $\mu_{ij}$.

Thus, each clique can be modeled as a mixture of Gaussian process:

$$P_i(y|x) = \sum_{j=1}^{K} g_{j|i} P_{j|i}(y|x, U_{ij}) \quad (4)$$

And the probability density of the final output of the model is a mixture of mixtures of Gaussians:

$$P(y|x) = \sum_{i=1}^{L} \sum_{j=1}^{K} g_i g_{j|i} P_{j|i}(y|x, U_{ij}) \quad (5)$$

All parameters in this probability model, for example, $$\Theta = \{U_{ij}, W_{ij}, v_i, \Sigma_{ij}\} \forall i, j$$

are initially unknown, and they can in principle be found by calculating the gradients of the sum of the logarithm of the probabilities for each data point pair, and then varying the parameters by successive small steps in the direction towards a maximum. The starting value for the parameters is prior knowledge or simply a random choice.

The central methodological step, which is part of the framework known as Expectation Maximization (EM), is to introduce a set of special hidden variables in such a way that, if the values of these unknown variables were known, the solution of the maximization problem would be significantly simplified. Thus, using prior knowledge of the systems parameters, the hidden variables can be estimated. Then, using these estimates, the parameters of the system are updated.

For the problem at hand, a set of hidden indicator variables is introduced. For the gating networks in each clique, an indicator variable $z_{j|i}$ is defined for each expert, whereby only one of the L×K $z_{j|i}$'s can be equal to 1, while all the others are zero. The same is done for the final gate; for each clique one indicator variable is specified, $z_i$ of which only one can have the value 1 while all the others are 0. Further, a variable $z_{ij} = z_i z_{j|i}$ is defined which has the value 1 only if expert j in the i-th clique is on and no one else. The variables $z_i$, $z_{j|i}$ and $z_{ij}$ are missing variables, and it is assumed that they are different for each data pair $\{x^{(t)}, y^{(t)}\}$ processed by the system.

In computing the join probability of the output data y and the probability of variable $z_{ij}$ having the value of 1, only the (ij) combination of indexes remains from the sum of equation 5, and since any $z_{ij}$ can only be 0 or 1, using an exponentiation with $z_{ij}$ this join probability can be rewritten as a product:

$$P(y, z_{ij} = 1 | x) = g_i g_{j|i} P_{j|i}(y; x, \Theta) \quad (6)$$

$$= \prod_{i=1}^{L} \prod_{j=1}^{K} (g_i g_{j|i} P_{j|i}(y|x, \Theta))^{z_{ij}}$$

Taking the logarithm of this function, and summing over all data pairs, one gets the sum of all likelihoods, the complete data likelihood, as follows:

$$l(\Theta | \{x, y\}) = \sum_{t} \sum_{i=1}^{L} \sum_{j=1}^{K} z_{ij} (\ln g_i^{(t)} + \ln g_{j|i}^{(t)} + \ln P_{j|i}(y^{(t)} | x^{(t)}, \Theta)) \quad (7)$$

Since $z_{ij}$ are missing variables, the most that can be done is to make the most reasonable assumption about each of the missing variables for each data point.

At an iteration step k we have a certain prior estimate of the parameters of the system as $\Theta^{(k)}$. Using this current estimate of $\Theta$ we can compute the expectation value of the complete data likelihood, which is a function of the $\Theta^{(k)}$ and the data, which are given and denoted as {x,y} here. First, if the probability of $z_{ij}$ being equal to 1 was known as a number $h_{ij}$, then the expectation value of the total likelihood function, summing over all data, would be $$Q(\Theta^{(k+1)} | \{x, y\}, \Theta^{(k)}) = \sum_{(l)} \sum_{i=1}^{L} \sum_{j=1}^{K} h_{ij}^{(t)}(\ln g_i^{(t)} + \ln g_{j|i}^{(t)} + \ln P_{j|i}(y^{(t)}; x^{(t)}, \Theta)) \quad (8)$$

For each data point, the probabilities $h_{ij}$ can be estimated. For each indicator variable $z_{j|i}$ the probability of it being equal to 1, given the observations of the data and the prior estimate of the system parameters, is, for $j=1, \ldots, K$:

$$P(z_{j|i}^{(t)} = 1 | i) = h_{j|i}^{(t)} = \frac{g_{j|i}(x^{(t)}, W_{ij})P(y^{(t)} | x^{(i)}, \Theta_{ij})}{\sum_{k=1}^{K} g_{k|i}(x^{(t)}, W_{ij})P(y^{(t)} | x^{(i)}, \Theta_{ij})} \quad (9)$$

This represents the probability of a data point being generated by expert j, if it is known that the expert is in clique i.

$$P(z_i^{(t)} = 1) = h_i^{(t)} \quad (10)$$

$$= \frac{g_i(x^{(t)}, v_i) \sum_{j=1}^{K} g_{j|i}(x^{(t)}, W_{ij})P(y^{(t)} | x^{(i)}, \Theta_{ij})}{\sum_{l=1}^{L} g_l(x^{(t)}, v_l) \sum_{k=1}^{K} g_{k|i}(x^{(t)}, W_{ik})P(y^{(t)} | x^{(i)}, \Theta_{ij})}$$

Next, is the probability that some expert in clique i has generated the data. The product of these two indicator variables: is the probability that the expert j in clique i has generated the data.

$$P(z_i^{(t)} = 1) = h_{ij}^{(t)} \quad (11)$$

$$= \frac{g_i(x^{(t)}, v_i)g_{j|i}(x^{(t)}, W_{ij})P(y^{(t)} | x^{(t)}, \Theta_{ij})}{\sum_{k=1}^{K} g_{k|i}(x^{(t)}, W_{ik})P(y^{(t)} | x^{(i)}, \Theta_{ik})}$$

The parameters of each expert contain a matrix $U_{ij}$ which is the link between the input vector x and the expectation value $\mu_{ij}$ where it "believes" the output data are concentrated. The above calculated hidden variable probabilities for each data point are then used in the total data likelihood, see above equation 8. The gradient of $Q(\Theta, \Theta^{(k)})$ is then computed by differentiation with respect to each of the parameters in $\Theta$, The update equations for the parameters of the system can be obtained by moving in each iteration by a small amount in the direction of the gradients, scaled by a small number $\delta$:

The update equation for $U_{ij}$ is, using $\mu_{ij}^{(t)} = U_{ij}x^{(t)}$:

$$U_{ij}^{(k+1)} = U_{ij}^{(k)} + \delta \sum_{t=0}^{N} h_i^{(t)} h_{j|i}^{(t)}(y^{(t)} - \mu^{(t)})x^{(t)T} \quad (12)$$

The gate networks on the second layer are updated as follows, for each parameter vector:

$$v_j^{(k+1)} = v_i^{(k)} + \delta \sum_{t=0}^{N} (h_i^{(t)} - g_i(x^{(t)}, v_i^{(k)}))x^{(t)T} \quad (13)$$

And for all matrices of parameters for gating variables on the first layer, for the i-th clique and j-th gate matrix:

$$W_{ij}^{(k+1)} = W_{ij}^{(k)} + \delta \sum_{t=0}^{N} h_i^{(t)}(h_{j|i}^{(t)} - g_{j|i}(x^{(t)}, W_{ij}^{(k)}))x^{(t)T} \quad (14)$$

The covariance matrices $\Sigma_{ij}$ for each expert j in clique i, may need to be recomputed every time, or in some instances recomputation can be performed according to the following considerations. For each expert in the system a covariance matrix $\Sigma_{ij}$ exists of size D×D, where D is the number of dimensions of the output y. If expert j in clique i has predicted all the data y and no other expert "knew anything". This "know-it-all" expert, expert j, can estimate the covariance of the output by keeping a running sum of $y^{(t)}$ and of the moment matrix $y^{(t)}y^{(t)T}$. In other words, if the (i,j)th expert's indicator variable $z_{ij}$ was always equal to 1, it can compute $$\sum_{ij} = \frac{1}{N} \sum_t (y^{(t)} - \mu_{ij}^{(t)})(y^{(t)} - \mu_{ij}^{(t)})^T \quad (15)$$

However, in the more general case, the current state of the network indicates that expert j in clique i has generated the data only with a probability of $h_{ij} = h_i^{(t)} h_{j|i}^{(t)}$. So it can update its belief about sufficient statistics of the output by using only an accordingly weighted portion of the moments:

$$\sum_{ij} = \sum_t h_{ij}^{(t)}(y^{(t)} - \mu_{ij}^{(t)})(y^{(t)} - \mu_{ij}^{(t)})^T \quad (16)$$

Sample-by-Sample Iteration

The above update equations may imply first summing over all data points, and then updating all parameters. However, it is also possible to use re-estimates of the parameters at each data point, so that the next data point is analyzed using all information so far gathered from the data. This results in a faster convergence of the algorithm, and also in a simplification of the program code, since additional accumulators for each matrix are no longer necessary. In summary, the update equations are the following, excluding the update of the covariance.

$$U_{ij} \to U_{ij} + \lambda h_i^{(t)} h_{j|i}^{(t)}(y^{(t)} - \mu^{(t)})x^{(t)T}$$

$$W_{ij} \to W_{ij} + \lambda h_i^{(t)}(h_{j|i}^{(t)} - g_{j|i}(x^{(t)}, W_{ij}^{(k)}))x^{(t)T}$$

$$v_i \to v_i + \lambda(h_i^{(t)} - g_i(x^{(t)}, v_i^{(k)}))x^{(t)T} \quad (17)$$

where $\lambda$ is a small weighing scalar that regulates by how much the coefficients drift in the direction of their gradient descents. Additional work is needed in the computation of the covariance matrices $\Sigma_{ij}$. These matrices are actually used by their inverse, and further, the computation of the normal distribution requires us to know the determinants of all $\Sigma_{ij}$. It is therefore desirable to use a method in which the inverses of the covariance matrices are updated.

Update of the Covariance Matrices

For the computation of the covariance, weighted outer products of vectors with themselves can be added up. Thus, the update of a covariance matrix can have the following form (dropping the indices ij for convenience):

$$\Sigma \rightarrow \alpha^{(t)}\Sigma + \beta^{(t)}(y^{(t)}-\mu^{(t)})(y^{(t)}-\mu^{(t)})^T \quad (18)$$

Hereby the coefficients $\alpha$ and $\beta$ come from summing up $h_{ij}^{(t)}$ (dropped indices ij):

$$s^{(t)} \leftarrow s^{(t-1)} + h^{(t)} \text{ and } s^{(0)} = h^{(0)} \quad (19)$$

$$\beta^{(t)} \leftarrow \frac{h^{(t)}}{s^{(t-1)}}$$

$$\alpha^{(t)} \leftarrow 1 - \beta^{(t)}$$

A covariance matrix C is symmetric and positive definite, it can be decomposed into a product of a matrix square root with itself:

$$C = AA^T \text{ and } C^{-1} = A^{-T}A^{-1} \quad (20)$$

The root A is not uniquely defined, and the case of the Cholesky decomposition of C, which results in a lower triangular form of A, is only one possible case.

Based on the foregoing conclusions, a useful method for updating the covariance matrix can be provided using the teachings of T. Suttorp, N. Hansen, and C. Igel. [Ref #8] who describe how to update sample-by-sample the inverse of a square root of a covariance matrix, which results in a fast and robust algorithm. Under the assumption that the update equation for C by the outer product of a vector yn with itself has the following general form (with step index n):

$$C_{n+1} = \alpha C_n + \beta y_n y_n^T, \quad (21)$$

the authors show that the update equation for the factor matrix $A^1$ is found as follows, using as iteration index again the index n. Let:

$$z_n = A_n^{-1} y_n \quad (22)$$

Then the inverse square-root matrix can be updated as follows.

$$A_{n+1}^{-1} = \frac{1}{\sqrt{\alpha}} A_n^{-1} - \frac{1}{|z_n|\sqrt{\alpha}} \left(1 - \frac{1}{\sqrt{1 + \frac{\beta}{\alpha}|Z_n|^2}}\right) z_n (z_n^T A_n^{-1}) \quad (23)$$

Furthermore, using the Shermann-Morrison-Woodberg formula, it can be updated as follows: [Ref #3, p. 50.]

$$\det C_{n+1} = \alpha^D \left(1 + \frac{\beta}{\alpha} z_n^T z_n\right) \det C_n \quad (24)$$

Using the Output of the Hierarchical Mixture of Experts for Unit Selection and Synthesizer Signal Processing.
Acoustic Unit Selection During synthesis, the hierarchical mixture of experts combines the outputs of all experts and cliques by means of the gating network into one target vector for each segment. Further, the covariance matrices of all experts and cliques can be combined by the same weighting method to one covariance matrix for each segment. The inverse of this matrix contains for each segment information about the confidence of the target vector computed by the hierarchical mixture of experts. This information can be used when candidate acoustic units are selected by comparing them to the target vector. The target cost for a candidate unit cam be computed as follows: First the vector difference between the candidate's acoustic feature vector and the target vector is computed. The inverted covariance matrix is then multiplied from the left and right with the difference vector, resulting in a scalar quantity which becomes the candidate's target cost. It is computed for each candidate in each segment of a synthesized text. The join cost can be independently computed as a distance between features of pairs of candidates in two consecutive segments. The final unit selection consists of minimizing the total target cost over all segments and the total join cost by means of the Viterbi algorithm.
Signal Processing During and after Signal Synthesis.

The next stage of speech synthesis executed by this embodiment of speech synthesizer after unit selection is concatenation. Concatenation can be implemented as a separate module, if desired. This module receives the information for synthesis as a table containing the information from the final unit selection for each segment. This table specifies for each segment first of all the information required to access the original data for the unit, for example, a segment of audio signal stored as a digital wave file, by providing the name of the wave file and the beginning and ending time stamps for the unit. This information can be sufficient for the concatenator (concatenation module) to create a digital audio signal by concatenating the signal pieces. The concatenator can also make use of separately stored pitch marker files used to align two consecutive units properly at pitch marker positions.

To make controlled additional changes to the output signal at synthesis time, or afterwards, the format of the table received by the concatenator can be extended to provide control parameters for desired signal modifications such as duration changes, pitch changes and intensity changes. The following text describes first signal processing that can be used for duration changes and then how parameters that control the duration changes can be computed, taking into account the output of the hierarchical mixture of experts. Pitch and intensity changes are described briefly subsequently.

Duration changes to the synthesized signal can be obtained by using the following procedure, for which the input is the signal coming from the above described concatenation process, and a new output signal in which portions of the original signal have been stretched or compressed in time by repeating or skipping selected signal pieces, which can be weighed by a Hanning window function. Two indices, one in the computational implementation address pointers, and one in the following called pointers, point at the current position in the input signal and output signal, respectively. For each step one window weighted signal piece is processed. In each step, first the output pointer is incremented by half the duration of the window. Then the input pointer is incremented by an offset obtained as the product of one half the window length times the speed-up ratio, which is explained in more detail further below. For shortening in time, or speeding up, this increment is larger than one half the window length, and for slowing down the increment is shorter. Then, starting at the updated position of the input pointer, the program seeks in a small vicinity in the input signal a piece (of the duration of the window length) which has maximal similarity to the current end of the output signal. The computation is based on maximizing the cross correlation function between the two signals. The cross correlation is computed between the input and output windows that can be centered at the two pointers. Then, the first significant maximum is found in a small range, as a small offset not exceeding ½ of the window length. This offset is added to the current input pointer, thus moving the input pointer forward or backward in time by a small amount so that usually the input signal and the output signal in the vicinity of the two pointers has greater similarity than without changing the input. The input signal is then multiplied with the weighting window centered at the input pointer, and the weighted signal is added to the output signal at the end, centered at the output pointer.

A useful control parameter for duration changes is the ratio of duration between the original duration and the desired duration, and this number can vary over time. Two pieces of information can be used for this: A fixed, externally specified number representing a speed-up or slow-down percentage, and a second parameter that is computed depending on the output of the hierarchical mixture of experts. As described earlier, the hierarchical mixture of experts specifies for each segment an acoustic target feature vector. This vector contains as one coefficient the intended duration of the segment, which is usually not equal to the actual duration of the unit selected in the unit selection process. The hierarchical mixture of experts further provides an expected duration variance, for example, as one of the coefficients in the diagonal of the covariance matrix associated with the segment. The duration ratio is computed as the product of the fixed duration ratio and a scaling factor that depends on the ratio between intended and actual unit duration as well as on the expected duration variation. The motivation for this is that usually there may be statistical differences between the stretchability of speech sounds, which may be in part reflected in the duration variation computed by the hierarchical mixture of experts. For example, long stressed vowels can be rather stretchable, whereas plosive sounds can be relatively invariant. The position of the sound in the word as well as the stress value influences this variability. For example, final nasal consonants (e.g., n or m) usually have larger duration variability than word initial nasal consonants. Using the hierarchical mixture of experts's predictions for target duration and duration variability is motivated by the fact that the fixed hierarchical mixture of experts parameters have been found before in training the hierarchical mixture of experts with the entire data base.

Pitch and Intensity Changes

The control parameters for pitch changes and intensity changes can make use of the hierarchical mixture of experts' target predictions. The control parameters can be sent to the concatenator as special commands that contain gain values in decibel for the intensity, and semitones for the modification of pitch. In some cases, the control parameters remain constant through a sentence or paragraph and remain at their default values (no pitch or intensity changes) or can be sent once only to the concatenator at the beginning of synthesis. Otherwise, to avoid abrupt changes, the concatenator module smoothes out step changes of these parameters.

Intensity changes may be a simple change, since they can sometimes be effected simply by multiplying the output signal amplitude with a scaling factor. Changes in pitch can be implemented by applying the following steps to short time windows of the signal: Reflection coefficients, for example, PARCOR coefficients, can be computed and the residual signal is obtained by inverse filtering. The residual signal is then modified using a Laguerre transformation, after which it is sent through a lattice filter using the reflection coefficients previously computed.

Adaptive Tuning of the Synthesizer by Reinforcement Learning

System embodiments that include a hierarchical mixture of experts predictor and a back-end synthesizer can also include a number of tuning parameters which can influence the quality of the results. Some parameters that can be used in optimization include the coefficients in the experts of the hierarchical mixtures of experts and in the gating networks. These parameters can be found by several training steps, or other means, wherein the machine learning method of the hierarchical mixture of experts training described previously, can be a supervised learning algorithm. An error signal comprising the difference between the predicted acoustic variables and the actually observed acoustic parameters, can be transformed into incremental changes of the parameters of the models.

The model remains fixed after training the hierarchical mixture of experts, and the predictions of the model can be used as input for the unit selection algorithm in the synthesizer. Unit selection is done by using the model's output as a template in a data base query to find candidate units for each segment of the text to be synthesized. The final quality of the output of the synthesizer however does not depend only on the unit-selection step but also on the final Viterbi procedure that minimizes the total cost consisting of target cost as distance between the candidate units and the predicted targets, and the join cost which is computed as a distance between consecutive units. The target cost serves to optimize for proximity of the synthesis to the target trajectory predicted by the hierarchical mixture of experts model, and the join cost serves to optimize for smoothness.

A problem that may arise in some cases, from the content of some uttered speech, or some text, even if the predictions of the hierarchical mixture of experts model are highly accurate for the training set employed, is that the synthesizer may not be able to generate accurately what the hierarchical mixture of experts model predicts. This may be because, for some arbitrary text, certain predicted phonetic subunit sound may not exist in the database and may have to be substituted for by other phonetic subunits that most closely resemble the predicted phonetic subunits. This may result in acoustic glitches and other perceptual effects that are audible in the synthesized signal because they do not naturally occur in real speech. Accordingly, for some purposes, certain additions can be employed in the text dictionary database, or additional phonetic subunits can be recorded to extend the synthesizer's capacities to predict and find the phonetic subunits for the specific application(s).

A further problem that may arise, in some cases, during training of the hierarchical mixture of experts model, is that the way in which the final Viterbi search influences the synthesis result may not be taken into account. Still further, a number of additional tuning parameters may exist in the complete algorithm that are not directly trained in the hierarchical mixture of experts training, for example, various weighting parameters that are used in join cost computations. Separating the training of the hierarchical mixture of experts from the optimization of the overall synthesizer can sometimes avoid complexity, but may deprive the algorithm of some perceptually relevant criteria for optimality, for example, minimizing the difference between the finally concatenated sequence of units as a whole to the previously recorded speech signal.

To solve these problems further embodiments of the invention can use methods that rather than modeling the statistical nature of the synthesizer, treat the steps from predicting targets to the finally generated speech signal as an essentially external process of the environment with which the hierarchical mixture of experts interacts. For this purpose the hierarchical mixture of experts learning phase (either in the entire hierarchical mixture of experts or, for the two-stage hierarchical mixture of experts model, in the second hierarchical mixture of experts) can be modified into a machine learning algorithm based on a paradigm of reinforcement learning. Some suitable reinforcement learning methods that can be employed are described by L. P. Kaelbling, et. al. [Ref #9] and P. N. Sabes and M. I. Jordan. [Ref #8] Further embodiments using product probability distributions of multiple quasi-independent agents such as are described in D. H. Wolpert, et. al. [Ref #11], will be described in more detail subsequently.

In reinforcement learning the configuration is split into a learner or learning network and the environment. In one useful application of reinforcement learning that can be employed in embodiments of the invention, the hierarchical mixture of experts model predicting acoustic observables is the learner, and the synthesizer (for simplicity, the synthesizer is reduced to the unit selection algorithm and Viterbi search for concatenation) provides the environment. As in a hierarchical mixture of experts framework, the model, for a given input or sequence of input x, predicts an output or sequence of output y. With y as input, the synthesizer generates output z and then computes a scalar reward to the learner based on a simple distance measure in the acoustic space, for example, by comparing the synthesizer's final selection of units with the known speech productions in the data base. The learning task is to adjust the parameters of the predictor model to maximize the reward it receives. As described, for example, in [Ref #8], or [Ref #10], the learning can include maximizing the expectation of the reward postulates that the probability distribution of the reward is an exponential function reward, for example, by treating the reward (which is always positive) as a negative energy. Using this Boltzmann distribution for the reward the distribution of the reward becomes similar to a thermodynamic potential, and higher reward, which corresponds to lower energy, makes outputs that result in higher rewards more probable. The learning goal maximizing reward is then replaced by a probability matching task, which consists of minimizing the difference between an estimated—or one might say anticipated—reward and the true reward. The cost that needs to be minimized is expressed as a probability matching cost analog to Helmholtz's free energy from statistical mechanics, and thus the algorithm tries to minimize the free energy by both maximizing reward and entropy. The direction of change of the model parameters of the hierarchical mixture of experts in learning is calculated as a gradient depending on the (current) parameters of the hierarchical mixture of experts model, and the magnitude of change depends on the difference between the estimated and actual reward. The estimated reward is computed based on the difference between the predictions of the hierarchical mixture of experts and the actual acoustic data, and the true reward is computed from the difference between the output of the synthesizer and the actual acoustic data. If the two measures become fairly close most of the time, it means that the hierarchical mixture of experts's predictions are most of the time as far or as close to the actual acoustic data as the synthesizer's output is. No matter how complex the true distribution of the reward function may be, as long as the hierarchical mixture of experts makes predictions so that there is close agreement between the reward that it predicts, and the actual reward that it receives, the two distributions become more similar.

Figure 8:
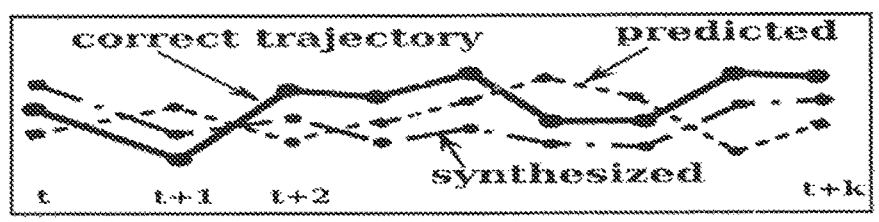
FIG. 8 is a schematic view of a computation for Boolean input vectors that can be employed in embodiments of the invention.

FIG. 8 illustrates an example of training a network using a reward function. In FIG. 8, "correct trajectory" represents a known recorded trajectory from training data. "predicted" represents initial output of hierarchical mixture of experts training "synthesized" represents an actual output of the described speech synthesizer Using the teaching in [Ref #8] the learning updates in the hierarchical mixture of experts can be driven by the scalar difference between the expected reward and the true reward scaled by the temperature parameter in the Boltzmann distribution. Initially, the temperature is held at a high level. Under the condition of high temperature, the true reward is scaled down and essentially ignored, and the resulting parameter changes can be done in the same way as in the original hierarchical mixture of experts model, for example, based on comparing predicted acoustic feature vectors to actual ones. As learning progresses, the temperature is lowered and the model parameter updates during learning can be influenced by the true reward, which was obtained by comparing the synthesizer's output with the actual acoustic data. The implementation of this algorithm only requires a few modifications in the update equations shown previously, for example, scaling the increments in the three equations (17) by multiplying the variable $\lambda$ by the difference of predicted and actual reward, thus regulating the velocity of the drift of the coefficient matrices in the hierarchical mixture of experts learning algorithm.

Embodiments of the invention further can include use of a predictive learning model configured by extending the definition of the reward, so that future consequences for a decision at the present can be taken into account and reflected in the reward function. In some cases, optimization takes place only over a small interval of perhaps 5-10 units, for example, as shown in FIG. 7. The fat line represents the actual acoustic trajectory, a path in the domain of acoustic observables. The dotted line represents the output of the hierarchical mixture of experts, and the dash-dot line, the resulting trajectory computed by the unit selection algorithm of the synthesizer. Processing up to point t is assumed to be complete and it is now time for the hierarchical mixture of experts to make predictions for time t+1, t+2, etc. to t+k. The decision for t+1 not only has consequences for that point on the trajectory but also for the next several points. Depending on the prediction at time t+1, the synthesizer may come up with quite different paths even if all subsequent estimates of the hierarchical mixture of experts for t+2, . . . , t+k can be exactly the same as shown. The reward calculation can be tracked backwards to the time t+1 over a reasonable interval. A useful algorithm can operate as follows: The hierarchical mixture of experts model predicts the acoustic observables and the expected reward for t+1, and stores away its state for time t+1. The hierarchical mixture of experts model then proceeds to make predictions for the next time stamps, t+2, . . . , t+k, while also computing the expected reward. The estimates the hierarchical mixture of experts model delivers for t+1 to t+k can be sent to the synthesizer as the acoustic target trajectory. The synthesizer, starting at its state for time t continues and elongates the path until t+k (the trajectory labeled synthesized), making the provisory assumption that the end of the path is prescribed to equal the correct value (In the figure this is represented by a thin dotted line). This is necessary because the optimal path obtained in the Viterbi algorithm is obtained by back-tracking starting from the end of the path. After the minimal path is known the actual reward function can be computed for times t+1 to the time t+k−1, but excluding t+k. It is now possible to compute the sum of the differences between predicted and actual reward for the interval from t+1 to t+k−1, wherein lower weights are given to the values further ahead and the highest weight is given to t+1.

The hierarchical mixture of experts algorithm then restores its state to the value for t+1, and makes a learning step in the direction of the gradient descent of its parameters computed for its state at t+1. The magnitude of change of the parameters is proportional to the cumulative difference of rewards for the entire path up to t+k−1. After that, the same procedure is repeated using as the initial point not t but t+1 and as the end point t+k+1 or the end of the phrase.

Distributed Reinforcement Learning for Optimization of Coefficients in the Join Cost The join cost computation in the Viterbi algorithm depends on a set of weighting coefficients which determine the relative weight of the join cost to the target cost, and within the join cost the relative weight of different spectral parameters and other acoustic parameters.

In this algorithm the problem of optimization of join cost coefficients is stated as a competitive game of independent agents which each try to maximize simple utility functions. In this game, each agent is in charge of one of the coefficients, and by varying the coefficient the agent can improve the agent's utility. A simple method here is to choose for each agent a small number of possible values that the agent can play. The agents play independently from each other using mixed strategies, for example, choosing randomly one of their allowed coefficient values with a probability that is derived from their previous experience. Each agent starts with a max-entropy distribution, which in this case means giving each coefficient equal probability, whereby the probabilities for each coefficient can be stored in a list. After each choice of action from the agent's mixed strategy, for example, choosing randomly a coefficient from the agent's list, the agent keeps track of the action the agent chose and of the received reward. Before each decision of an action, the agent computes the expected value of the reward under the agent's action probability distribution. The agent then makes a random choice by sampling this current probability distribution, which may result in choosing a coefficient that has a higher probability value in the list. After receiving the actual reward the agent compares this with the previously computed expectation value and then adjusts the probabilities so that the newly computed expected return would be closer to the just received return than the previous expected return. Such a learning step in the agent can be implemented by stepping by a small amount in the direction of a computed gradient of a function that is very similar to a free energy, as in the probability matching method. The learning step is followed by a renormalization that ensures that the probabilities add up to 1.

A useful ingredient for the functioning of this game is the proper distribution of the reward to the different agents. The reward function can be similar to how the reward in the above described modified hierarchical mixture of experts training is computed, for example, from the difference between the acoustic parameters computed from the synthesizer's output and the acoustic parameters measured from the recordings. Yet, the agents need not be 'blamed' or 'rewarded' equally in all situations. For example, some of the coefficients weigh the difference in F0 for the computation of the join cost. For joins in which both concatenated sounds can be voiceless, the agent in charge of an F0-related weight should not take credit for a good join and need not be blamed too much for a bad join. As another example, an agent that is concerned with finding an optimal spectral weight for a higher frequency component of the speech spectrum can be given some slack for voiced sounds for which the lower frequency components are important.

The actions of the agents can be independent in the sense that each agent's strategy does not in any way depend on state information of the other agents. However, by making use of a more global utility function for the rewards results in the emergence of cooperation of the agents towards optimization of the join cost. This optimization method can be used simultaneously with the reinforcement learning described in the previous section, because it is easy to formulate more than one type of reward function from the difference between the synthesized and the measured speech signal.

Combining a Hierarchical Mixture of Experts with Deep Belief Networks

In comparing one prosody with another, the same sentence, phrase structure, and word sequence are pronounced differently according to prosodic rules of speech. For example, the objective meaning of sentences and phrases may be the same, but each rendition is different from the other rendition in terms of emotional state of the speaker, the durations of playable vowels and consonants, the rhythms embedded in the phrasings, etc. This is a reason for identifying the differences of the voice segment units targeted according to the differences yielded by the two different prosodic rule sets. For example, a speech synthesis method can seek to obtain optimal weights for reportorial speech prosody, which, having no prosodic tag on the phonetic subunits in the sentences, can be the "default" identities of the Reportorial Prosodic synthesis. Similarly, an alternate rendition can have its phonetic subunits tagged with an addition to the phonetic subunit as occurring in a "Human Interest" prosody. The phonetic subunits that are significantly different in MCEP feature values (F0, Energy, Duration, F0 change profile, Formant Shape, Formant Intensity, delta values of profiles indicating the changing rates for the rates of change).

Embodiments of the invention can employ neural network methods for identifying patterns, in speech recognition. For example, one or more deep belief networks (DBN) based on a bi-directional neural network such as a reduced Boltzmann machine (RBM) can be employed. Some examples of useful RBMs are described by Hinton and Osindero [Ref #13] and Salakhutdinov and Hinton [Ref #14]. In one example, a reduced Boltzmann machine includes one input layer and one hidden layer. The machine is called "reduced" because there are no connections within the hidden layer, and usually also no mutual connections in the visible layer. In the RBM the only connections exist between the cells of the input layer and the hidden layer. The hidden layer is binary, that is each cell has only the states 0 or 1. The visible layer is usually binary as well, but can instead also be made of cells with a continuous state, while specific assumptions can be made about the statistical nature of the process that generates the input, for example, Gaussian. Training a RBM can be done by methods called contrastive divergence learning, such as is described by Carreira-Perpinan and Hinton [Ref #15] making direct use of the bi-directional nature of the RBM model. An implementation useful in a speech synthesizer or voice recognition embodiment of the invention will now be described briefly.

For (unsupervised) learning with a data set of patterns, the patterns can be fed into the visible layer of the RBM. In an up step, for each pattern, the visible layer states can be multiplied by the network weights and transformed by a sigmoid function, $s(x)=1/(1+\exp(-x))$, where x is the input variable. This compresses x nonlinearly to s(x) in the interval from 0 to 1. This becomes the activation of the hidden cells. The hidden states then can be updated by using the activations either directly, or by interpreting it as the probability of the cell in the hidden layer to be in state 1, and using a random generator to set the state to 1 with that probability. Next, in a down step, the hidden states can be used as input to the network connecting them with the visible cells. Using the same weights of the network in reversed direction, an estimate of the visible layer is computed, given the hidden states. The weights of the network then can be updated using the difference between the actual visible state and the estimated visible state. The RBM model captures during training some of the statistical regularities of the data that can be used for training. This is because the learning process optimizes the weights in the network such that for a given input pattern the network's response of an estimated pattern tends to become more similar to the input pattern.

To build a deep belief network for inclusion in an embodiment of the invention, the RBM structure can be extended and used in the following way. First an RBM can be trained using the data as visible input. This RBM is then fixed (no updates of the weights) and a second RBM is trained which receives the hidden states of the first RBM as its visible input. After that both networks can be fixed, and a third RBM is trained receiving the hidden layer of the second one as input, and so forth with further RBMs. Such deep belief networks can perform data abstraction retaining information (stored in its trained weights) that enables the network to create a representation in the hidden layers that is likely to capture statistical structures inherent in the training data. With this approach the deep belief network structure can be employed as a machine that discovers features in the training data, without the need to explicitly define the nature of these features. The deep belief network could be said to learn "memorization tricks" to capture the "essence" of the data. The RBM structure can then be used as a feature generator. In a figurative sense, the bits of the highest hidden layer computed by the trained network for a given input pattern can represent the "meaning" of the pattern. Such a DBN can be combined with other structures for machine learning, either supervised or unsupervised.

Used in combination with one or more hierarchical mixture of experts systems, a DBN can have at least one helpful application. The linguistic features that can be computed from the text, and which then can be used as input pattern for the hierarchical mixture of experts model, are usually high dimensional. There is substantial variation of the frequency at which certain linguistic features may occur in the data. Accordingly, various sub-patterns in the feature vectors may be more important than other features, many possible patterns never occur, and many that do occur in the data can be irrelevant. To address these issues a DBN can be trained on the patterns of linguistic features from the data base. Such training enables a lower dimensional and likely more salient feature representation to be obtained by using the states of the highest layer of the DBN as a new type of feature vector. Such new feature vectors may provide a more efficient encoding than the original linguistic feature vectors. Subsequently, both in training and use of the hierarchical mixture of experts, the linguistic features can be transformed into these new features as input to the hierarchical mixture of experts model, which then learns mapping from its feature input to acoustic features.

Computerized Systems

The invention includes computerized systems, or machines, for synthesizing speech from text or other graphic characters, computerized systems, or machines, for recognizing utterances of human speech and rendering the utterances as text or other graphic characters, and computerized systems, or machines for other purposes relevant to the objects of the invention. Such computerized systems can comprise one or more suitable computerized devices employing or accessing at least one program stored in non-transitory computer-readable media, for example, random access memory, or long-term memory. The at least one program can be capable of performing or implementing one or more of the methods described herein or an individual step or step in one of those methods. The program, or each program, can include, or consist of, executable program code, or executable program logic, optionally, with instructions for carrying out any one or more of the methods, method steps, or modules, described herein, and, optionally, can be stored in non-transitory computer-readable media.

Computerized system embodiments of the invention can include, or consist of, for example, a general-purpose computer, a special-purpose computer, a smart phone, or another computerized device, for example, a computer chip, a computer circuit board, a computer system module, or other suitable computer system or computer device, including a programmable logic device, a field programmable gate array (FPGA), discrete components, integrated circuitry, an application specific integrated circuit (ASIC)), or other means and combinations of the foregoing. 'A computerized system embodiment of the invention can include any one or more of: an input device such as a keyboard, mouse, tablet, pad, touch screen, camera, scanner, or microphone for receiving input, for example, from a user; a display device such as a video screen for displaying information to a user; non-transitory computer readable media; dynamic memory into which program instructions and data can be loaded for processing; a processor for performing data processing operations.

The processor can comprise or consist of a microprocessor, a central processing unit (CPU), a microcontroller, a digital signal processor, a parallel processor, another suitable processor.

The storage media can comprise, for example, RAM, ROM, PROM, EEPROM, Flash-Programmable RAM, one or more flash memory devices, stick memory, hard disks or hard disk drives, diskettes, optical memory devices, CD-ROMs, PC cards, PCMCIA cards, or other storage device or storage medium, or memory device, for storing text, data, speech and software or software tools useful for implementing one or more embodiments of the invention. Alternatively, or in addition, remote storage can be employed for data and/or programs, which data and/or programs can be retrieved as needed, for example across the internet.

Suitable computer devices include a stand-alone personal computer, a workstation, a networked computer or may comprise distributed processing distributed across numerous computing systems, or another suitable arrangement as desired. Files and programs useful in implementing the methods of the invention can be located on the computer system performing the processing or at a remote location.

Figure 10:
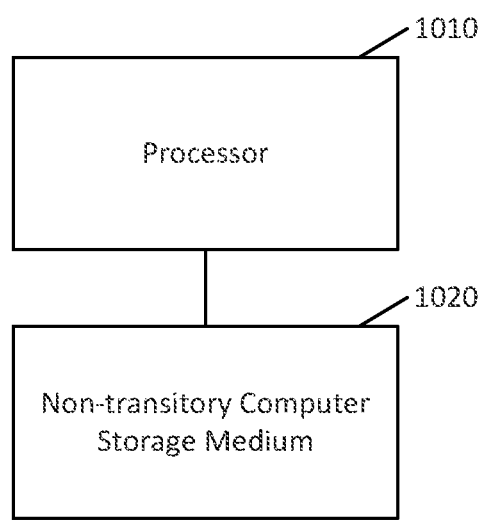
FIG. 10 is a block diagram of an example system, according to an example embodiment of the present disclosure.

FIG. 10 is a block diagram of an example system. Processor 1010 may perform data processing operations of the methods described in the present disclosure based on program instructions which are stored in non-transitory computer readable medium 1020.

Programs, program code and/or program logic useful for implementing or practicing the invention can be written, created or assembled employing any suitable programming language, for example, an object code, an assembly language, a high-level language, Microsoft Corporation's C, C++, C#, Fortran, Open GL, GPU instruction sets, JAVA, HTML, commercially available components, any of which can be for use with a particular operating system or operating environment. A computer program or program logic implementing all or part of the functionality described herein can be embodied in various forms, including, but not limited to, a source code form, a computer executable form, and various intermediate forms, for example, forms generated by an assembler, compiler, linker, or locator. The source code can be in a computer executable form (e.g., via an interpreter), or the source code can be converted, for example, via a translator, an assembler, or a compiler into a computer executable form.

Also by way of example, Carnegie Mellon University's LINK GRAMMAR text parser and the Stanford University Part of Speech Tagger can be employed in text parsing, as can other applications for natural language processing that are known or become known to a person of ordinary skill in the art, for example, dialog systems, automated kiosks, automated directory services, and other tools or applications. Such software, adapted, configured or customized to perform any of the processes of the invention can be implemented on a general purpose computing device or computing system, or a dedicated or a customized computing device or system to provide a special purpose speech synthesis or speech recognition device or system having any one or more of the particular features and elements described herein.

Various embodiments of the methods and systems of the invention can be useful for the generation of appealing, human-sounding synthetic speech for a wide range of applications, including audio or spoken books, magazines, newspapers, drama and other entertainment, voicemail systems, electronically enabled appliances, automobiles, computers, robotic assistants, games and the like.

Further embodiments of the methods and systems of the invention usefully can recognize human speech and, optionally, output the recognized speech as text, for example, in print, or on a display, for example, on a video screen.

Disclosures Incorporated.

The entire disclosure of each United States patent, each United States patent application, each international patent publication, each foreign patent publication, any other publication, and of each unpublished patent application identified in this specification is hereby incorporated by reference herein, in its entirety, for all purposes. Should a conflict appear to be present between the meaning of a term employed in the description of the invention in this specification and the usage of the term in material incorporated by reference from another document, the meaning of the term as used herein is intended to prevail. Any reference to an "invention" in any incorporated disclosure is to be understood to refer to the invention described, or claimed, in the incorporated disclosure.

About the Description.

The detailed description herein is to be read in light of and in combination with the descriptions of the background to the invention and of the brief summary of the invention where information regarding the written description of the invention, the best mode of practicing the invention, or description of modifications, alternatives or other useful embodiments of the invention may also be set forth explicitly, or implied, as will be apparent to one skilled in the art.

The terms "include," "have," "has," and "contain," and their various grammatical forms, are to be understood as being open-ended and not to exclude additional, unrecited elements or method steps.

Throughout the description, where compositions instruments, devices apparatus, systems, or processes are described as having, including, or comprising specific components or elements, or in the case of processes, specific steps, it is contemplated that compositions instruments, devices apparatus, systems, or processes according to the present invention can also consist essentially of, or consist of, the recited components, elements or steps.

In the application, where an element or component is said to be included in and/or selected from a list or group of recited elements or components, it should be understood that the element or component can be any one of the recited elements or components, or can be selected from a group consisting of two or more of the recited elements or components.

The use of the singular herein is intended to include the plural (and vice versa) unless the context indicates otherwise.

Also, where the term "about", "approximate", "approximately", or a similar term, is used before a quantitative value, the specific quantitative value itself is to be understood to be included, and to be explicitly recited, unless the description specifically states otherwise.

With regard to processes or methods, it is to be understood that the order of steps or order for performing certain actions is immaterial so long as the described process remains operable. Moreover, two or more steps or actions may be conducted simultaneously, unless the context indicates otherwise.

The description of the background of the invention herein may include insights, discoveries, understandings or disclosures, or associations together of disclosures, that were not known in the relevant art prior to the present invention but which are provided by the invention, and are to be considered elements of the invention. Some such contributions of the invention may have been specifically pointed out as being attributable to the invention, and other such contributions of the invention will be apparent from their context. Merely because a document may have been cited in this application, no admission is made that the field of the document, which may be quite different from that of the invention, is analogous to the field or fields of the present invention.

The description of the invention herein is to be understood as including combinations of the various elements of the invention, and of their disclosed or suggested alternatives, including alternatives disclosed, implied or suggested in any one or more of the various methods, products, compositions, systems, apparatus, instruments, aspects, embodiments, examples described in the specification or drawings, if any, and to include any other written or illustrated combination or grouping of elements of the invention or of the possible practice of the invention, except for groups or combinations of elements that are incompatible with, or contrary to the purposes of the invention, as will be, or become, apparent to a person of ordinary skill. Further, embodiments of the invention can have any configuration according to the invention that is described herein, or is shown in any accompanying drawings, and can employ any compatible ones of the useful materials or structures described herein.

Scope of the Invention.

The present invention includes the examples and embodiments described herein and other specific forms of the invention that embody the spirit or essential characteristics of the invention or of the respective described examples or embodiments and also includes the subject matter of the appended claims. The foregoing examples and embodiments are in all respects intended to be illustrative of the invention described herein. It is to be understood that many and various modifications of the invention, or of an example or embodiment of the invention described herein will be apparent to those of ordinary skill in the relevant art, or may become apparent as the art develops, in the light of the foregoing description. Such modifications are contemplated as being within the spirit and scope of the invention or inventions disclosed herein.

REFERENCES

1. P. Satyanarayana Murthy and B. Yegnanarayana; "*Robustness of group-delay-based method for extraction of significant instants of excitation from speech signals*"; Speech and Audio Processing, IEEE Transactions on, 7(6): 609-619, 1999.
2. Y. Cheng, W. Qi, and W. Cai; "*Dynamic Properties of Elman and modified Elman Neural Network*"; Proceedings, 2002 International Conference on Machine Learning and Cybernetics, 2002; vol. 2. IEEE, 2002, pp. 637-640.
3. G. H. Golub and C. F. Van Loan. *Matrix computations.* Johns Hopkins Univ Pr, 1996. ISBN 0801854148.
4. M. I. Jordan and R. A. Jacobs. Hierarchical mixtures of experts and the EM algorithm. *Neural computation*, 6(2): 181-214, 1994. ISSN 0899-7667.
5. Annukka K. Lindell. In Your Right Mind: Right Hemisphere Contributions to Language Processing and Production. Neuropsychol Rev (2006) 16:131-148.
6. Mark A Randolph, Syllable-based Constraints on Properties of English Sounds; RLE Technical Report No 555, May 1990, Massachusetts Institute of Technology, Cambridge, Mass. 02139, USA.
7. G. Bailly and B. Holm; SFC: A trainable prosodic model. *Speech Communication*, 46:348364, 2005.
8. P. N. Sabes and M. I. Jordan. Reinforcement learning by probability matching. *Advances in neural information processing systems*, pages 1080-1086, 1996. ISSN 1049-5258.
9. L. P. Kaelbling, M. L. Littman, and A. W. Moore. Reinforcement Learning: A Survey. *Journal of Artificial Intelligence Research*, 4:237-285, 1996.
10. David Wolpert and Stefan Bieniawski. Distributed control by lagrangian steepest descent. *CoRR*, cs.MA/0403012, 2004.
11. D. H. Wolpert, C. E. M. Strauss, and D. Rajnarayan. Advances in distributed optimization using probability collectives. *Advances in Complex Systems*, 9(4): 383-436, 2006. ISSN 0219-5259.
12. T. Suttorp, N. Hansen, and C. Igel. Efficient covariance matrix update for variable metric evolution strategies. *Machine Learning*, 75(2):167-197, 2009. ISSN 0885-6125.
13. Geoffrey E. Hinton and Simon Osindero, A fast learning algorithm for deep belief nets, Journal of Neural Computation, 2006, vol 18.
14. Ruslan Salakhutdinov and Geoffrey Hinton; *An Efficient Learning Procedure for Deep Boltzmann Machines*; MIT Technical Report MIT-CSAIL-TR-2010-037, 2010
15. Miguel Á. Carreira-Perpiñán and Geofrey E. Hinton; *On contrastive divergence learning*, Dept. of Computer Science, University of Toronto; 6 King's College Road. Toronto, ON M5S 3H5, Canada. Retrieved from http://learning.cs.toronto.edu

The invention claimed is:

1. A method for aligning a sequence of expressive speech utterances with corresponding text, the method comprising:
   processing a speech signal embodying the sequence of expressive speech utterances, the speech utterances being pronounced according to defined prosodic rules;
   marking the speech signal with a pitch marker at a predetermined point in a cycle of the speech signal, the pitch marker indicating a pitch change in the speech signal and the speech signal is additionally marked with at least one further pitch marker at the same predetermined point in a further cycle of the speech signal;
   refining placement of the pitch marker resulting in a pitch marked speech signal;
   providing a sequence of prosodically marked text;
   predicting an acoustic target value associated with a first phonetic subunit associated with the sequence of prosodically marked text;
   retrieving, a plurality of segmental speech units based on the acoustic target value;
   selecting, a segmental speech unit of the plurality of segmental speech units as a first selected segmental speech unit;
   employing a first hierarchical mixture of experts (HME) and a second HME, to relate a sequence of selected segmental speech units, including the first selected segmental speech unit, to the sequence of prosodically marked text, wherein the second HME is trained with the first HME, and the sequence of selected segmental speech units is evaluated by the first HME before being evaluated by the second HME;
   aligning the sequence of prosodically marked text with the pitch marked speech signal into an aligned speech signal; and
   converting the aligned speech signal into an outputted speech signal sequence.

2. A method according to claim 1, further comprising operating the first hierarchical mixture of experts recursively to reduce an error signal and enable the first hierarchical mixture of experts to learn.

3. A method according to claim 1, further comprising training the second HME after training of the first HME.

4. A method according to claim 1, further comprising refining an output of the first HME with the second HME.

5. A computerized speech synthesizer, comprising non-transitory computer-readable media and a program stored in the non-transitory computer-readable media, the program including instructions for performing the method according to claim 1.

6. The computerized speech synthesizer of claim 5, wherein the program further comprises instructions for operating the first hierarchical mixture of experts recursively to reduce an error signal and enable the first hierarchical mixture of experts to learn.

7. The computerized speech synthesizer of claim 5, wherein the program further comprises instructions for training the second HME after training of the first HME.

8. The computerized speech synthesizer of claim 5, wherein the program further comprises instructions for refining an output of the first HME with the second HME.

9. Non-transitory computer media storing at least one program including instructions for performing a method according to claim 1.

10. The non-transitory computer media of claim 9, wherein the at least one program further comprises instructions for operating the first hierarchical mixture of experts recursively to reduce an error signal and enable the first hierarchical mixture of experts to learn.

11. The non-transitory computer media of claim 9, wherein the at least one program further comprises instructions for training the second HME after training of the first HME.

12. The non-transitory computer media of claim 9, wherein the at least one program further comprises instructions for refining an output of the first HME with the second HME.

* * * * *